(12) United States Patent
Klassen et al.

(10) Patent No.: US 11,985,099 B2
(45) Date of Patent: *May 14, 2024

(54) HANDHELD ELECTRONIC DEVICE AND ASSOCIATED METHOD PROVIDING TIME DATA IN A MESSAGING ENVIRONMENT

(71) Applicant: BlackBerry Limited, Waterloo (CA)

(72) Inventors: Gerhard Dietrick Klassen, Waterloo (CA); Christopher R. Wormald, Kitchener (CA); Lawrence Edward Kuhl, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/095,108

(22) Filed: Jan. 10, 2023

(65) Prior Publication Data

US 2023/0142164 A1 May 11, 2023

Related U.S. Application Data

(63) Continuation of application No. 16/983,861, filed on Aug. 3, 2020, which is a continuation of application (Continued)

(51) Int. Cl.
*H04L 51/04* (2022.01)
*G06F 15/02* (2006.01)

(Continued)

(52) U.S. Cl.
CPC ............. *H04L 51/04* (2013.01); *G06F 15/02* (2013.01); *H04L 51/08* (2013.01); *H04L 51/216* (2022.05);

(Continued)

(58) Field of Classification Search
CPC ......... H04L 51/00; H04L 51/07; H04L 51/21; H04L 51/04; H04L 51/216; H04L 51/224; H04L 51/234

See application file for complete search history.

(56) References Cited

U.S. PATENT DOCUMENTS 5,241,305 A 8/1993 Fascenda et al.
5,631,949 A 5/1997 Milton
(Continued)

FOREIGN PATENT DOCUMENTS

CA 2745319 8/2003
EP 0743762 11/1996
(Continued)

OTHER PUBLICATIONS

[No Author] "Definition of Reducing by Merriam-Webster," available on or before Apr. 21, 2009, https://www.merriam-webster.com/dictionary/reducing, 2 pages.

(Continued)

*Primary Examiner* — Johnny B Aguiar
(74) *Attorney, Agent, or Firm* — Fish & Richardson P.C.

(57) ABSTRACT

An improved handheld electronic device and an associated method are provided in which time data regarding certain aspects of a messaging conversation on a handheld electronic device are made available to a user. Such time data is provided, for instance, in situations where an interruption has occurred during a messaging conversation. Time data can also be provided to a user on demand in certain circumstances.

6 Claims, 7 Drawing Sheets

Related U.S. Application Data

No. 15/836,213, filed on Dec. 8, 2017, now Pat. No. 10,735,353, which is a continuation of application No. 15/294,077, filed on Oct. 14, 2016, now Pat. No. 10,708,202, which is a continuation of application No. 13/111,767, filed on May 19, 2011, now Pat. No. 9,503,400, which is a continuation of application No. 10/944,925, filed on Sep. 20, 2004, now Pat. No. 7,970,849.

(60) Provisional application No. 60/504,379, filed on Sep. 19, 2003.

(51) Int. Cl.
*H04L 51/08* (2022.01)
*H04L 51/216* (2022.01)
*H04L 51/226* (2022.01)
*H04L 51/58* (2022.01)
*H04M 1/72436* (2021.01)
*H04W 4/14* (2009.01)

(52) U.S. Cl.
CPC ............ *H04L 51/226* (2022.05); *H04L 51/58* (2022.05); *H04M 1/72436* (2021.01); *H04W 4/14* (2013.01)

(56) References Cited

U.S. PATENT DOCUMENTS

| | | | |
|---|---|---|---|
| 5,724,279 A | 3/1998 | Benaloh et al. | |
| 5,764,916 A | 6/1998 | Busey et al. | |
| 5,894,305 A | 4/1999 | Needham | |
| 5,896,567 A | 4/1999 | Ogushi | |
| 5,990,887 A | 11/1999 | Redpath | |
| 6,055,413 A | 4/2000 | Morse | |
| 6,078,583 A | 6/2000 | Takahara | |
| 6,205,565 B1 | 3/2001 | Bissett | |
| 6,212,548 B1 | 4/2001 | DeSimone et al. | |
| 6,288,715 B1 | 9/2001 | Bain et al. | |
| 6,292,769 B1 | 9/2001 | Flanagan et al. | |
| 6,301,609 B1 | 10/2001 | Aravamudan | |
| 6,370,563 B2 | 4/2002 | Murakami | |
| 6,484,196 B1 | 11/2002 | Maurille | |
| 6,519,639 B1 | 2/2003 | Glasser et al. | |
| 6,539,421 B1 | 3/2003 | Appelman et al. | |
| 6,590,529 B2 | 7/2003 | Schwoegler | |
| 6,606,309 B1 | 8/2003 | Wang | |
| 6,631,412 B1 | 10/2003 | Glasser | |
| 6,636,243 B1 | 10/2003 | MacPhail | |
| 6,661,434 B1 | 12/2003 | MacPhail | |
| 6,691,162 B1 | 2/2004 | Wick | |
| 6,720,863 B2 | 4/2004 | Hull et al. | |
| 6,792,448 B1 | 9/2004 | Smith | |
| 6,889,063 B2 | 5/2005 | Yamada | |
| 6,907,447 B1 | 6/2005 | Cooperman et al. | |
| 6,940,407 B2 | 9/2005 | Miranda | |
| 6,944,555 B2 | 9/2005 | Blackett et al. | |
| 7,031,743 B2 | 4/2006 | Kawasaki | |
| 7,043,530 B2 | 5/2006 | Isaacs | |
| 7,054,617 B2 | 5/2006 | Thomsen | |
| 7,099,700 B2 | 8/2006 | Hwang | |
| 7,107,077 B2 | 9/2006 | Lee | |
| 7,107,544 B1 * | 9/2006 | Luke | H04L 51/42 715/752 |
| 7,111,044 B2 | 9/2006 | Lee | |
| 7,167,703 B2 | 1/2007 | Graham et al. | |
| 7,181,497 B1 * | 2/2007 | Appelman | H04L 51/04 715/780 |
| 7,190,956 B2 | 3/2007 | Dorenbosch | |
| 7,236,472 B2 | 6/2007 | Lazaridis | |
| 7,243,130 B2 | 7/2007 | Horvitz | |
| 7,278,108 B2 | 10/2007 | Duarte | |
| 7,281,215 B1 * | 10/2007 | Canfield | H04L 51/04 715/752 |
| 7,305,441 B2 | 12/2007 | Mathewson, II | |
| 7,366,779 B1 | 4/2008 | Crawford | |
| 7,499,974 B2 | 3/2009 | Karstens | |
| 7,620,407 B1 * | 11/2009 | Donald | H04L 51/58 709/206 |
| 7,669,134 B1 | 2/2010 | Christie et al. | |
| 7,716,593 B2 | 5/2010 | Durazo et al. | |
| 8,150,930 B2 | 4/2012 | Satterfield | |
| 8,209,634 B2 | 6/2012 | Klassen | |
| 8,296,351 B2 | 10/2012 | Lazaridis | |
| 8,301,713 B2 | 10/2012 | Klassen et al. | |
| 8,326,327 B2 | 12/2012 | Hymel | |
| 8,676,929 B2 | 3/2014 | Lazaridis | |
| 9,349,120 B2 | 5/2016 | Kalu | |
| 2002/0023128 A1 | 2/2002 | Matsumoto | |
| 2002/0026483 A1 | 2/2002 | Isaacs | |
| 2002/0075303 A1 | 6/2002 | Thompson et al. | |
| 2002/0087649 A1 | 7/2002 | Horvitz | |
| 2002/0143916 A1 | 10/2002 | Mendiola et al. | |
| 2003/0001890 A1 | 1/2003 | Brin | |
| 2003/0018726 A1 | 1/2003 | Low et al. | |
| 2003/0060240 A1 | 3/2003 | Graham et al. | |
| 2003/0065721 A1 | 4/2003 | Roskind | |
| 2003/0104841 A1 | 6/2003 | Yamamoto | |
| 2003/0134616 A1 | 7/2003 | Thomsen et al. | |
| 2003/0225846 A1 | 12/2003 | Heikes et al. | |
| 2004/0015553 A1 * | 1/2004 | Griffin | H04L 51/04 709/206 |
| 2004/0111477 A1 | 6/2004 | Boss | |
| 2004/0137967 A1 | 7/2004 | Bodley | |
| 2004/0145608 A1 * | 7/2004 | Fay | G06Q 10/10 715/758 |
| 2004/0205775 A1 | 10/2004 | Heikes | |
| 2004/0228531 A1 | 11/2004 | Fernandez | |
| 2005/0018820 A1 | 1/2005 | Chaddha | |
| 2005/0080843 A1 | 4/2005 | Cabrera | |
| 2005/0080866 A1 | 4/2005 | Kent | |
| 2006/0010223 A1 | 1/2006 | Koch | |
| 2006/0075056 A1 | 4/2006 | Isaacs | |
| 2006/0129679 A1 | 6/2006 | Hlasny | |
| 2008/0301250 A1 | 12/2008 | Hardy et al. | |
| 2011/0047535 A1 | 2/2011 | Polakam et al. | |
| 2013/0095823 A1 | 4/2013 | Klassen | |
| 2013/0297802 A1 | 11/2013 | Laribi et al. | |
| 2020/0366627 A1 | 11/2020 | Klassen et al. | |

FOREIGN PATENT DOCUMENTS

| | | |
|---|---|---|
| EP | 1176840 | 1/2002 |
| EP | 1283489 | 2/2003 |
| GB | 2350746 | 12/2000 |
| GB | 2384150 | 7/2003 |
| JP | 02311145 | 12/1990 |
| JP | H03-89639 | 4/1991 |
| JP | 09214592 A * | 8/1997 |
| JP | 2000-330913 | 5/1999 |
| WO | WO 200122258 | 3/2001 |
| WO | WO 200169406 | 3/2001 |
| WO | WO 200124036 | 4/2001 |
| WO | WO 2001030091 | 4/2001 |
| WO | WO 200186472 | 11/2001 |
| WO | WO 200221413 | 3/2002 |
| WO | WO 2002021413 | 3/2002 |
| WO | WO 2002065250 | 8/2002 |
| WO | WO 2003081460 | 10/2003 |
| WO | WO 2004064362 | 7/2004 |

OTHER PUBLICATIONS

[No Author] "Understanding Proxy Server," Microsoft Corporation, 1997, http://www.henry.k12.ga.us/echservices/files/virus/proxy2_0/msproxy/prxdocs/htm/povwps.htm, 8 pages.
A Dictionary of Computing, 4th Ed., 1997, 147-148, 215.
A Dictionary of Computing, 6th Ed., 2008, 200.
A Dictionary of Computing, 6th Ed., 2008, 253 and 363.

(56) References Cited

OTHER PUBLICATIONS

Affidavit of Christopher Butler re URL <https://web.archive.org/web/20021002230452/http://gabber.sourceforge.net:80/, Nov. 2, 2018, 44 pages.
Alphaworks, "NotesBuddy," Jan. 10, 2001, https://web.archive.org/web/20030402215258/http://www.alphaworks.IBM.com:80/tech/notesbuddy/, 2 pages.
AOL Instant Messenger (AIM), "Overview," AOL, available on or before May 1997, 350 pages.
AOL Instant Messenger, "The New AOL Instant Messenger 4.0," Jun. 19, 2000, http://web.archive.org/web/20000619025533/http://www.aim.com:80/, 3 pages.
AOL Instant Messenger, "What's New in AIM 4.3," Mar. 9, 2001, http://web.archive.org/web/20010309005509/http://www.aim.com:80/, 3 pages.
Apple, "Apple To Offer Popular eMac to Consumers," Apple Press Release, Jun. 4, 2002, 3 pages.
Apple.com, "Apple Previews iChat Instant Messaging for Mac OS X," Apple Press Release, May 6, 2002, retrieved on Sep. 14, 2018, https://www.apple.com/newsroom/2002/05/06Apple-PreviewsiChat-Instant-Messaging-for-Mac-OS-X/, 2 pages.
Apple.com, "Jaguar "Unleashed" at 10:20p.m. Tonight," Apple Press Release, Aug. 23, 2002, 2 pages.
*BlackBerry Limited* v. *Facebook Inc. et al., BlackBerry Limited* v. *Snap Inc.* in the United States District Court Central District of California, Case Nos. CV 18-1844 GW{KSs), CV 18-2693 GW {KSx) before the Honorable George H. Wu, US District Judge, Civil Minutes—General, Document 68, pp. 1-28. Filed Aug. 21, 2018.
*BlackBerry Limited* v. *Facebook Inc., Whatsapp, Inc. Instagram, Inc., and Instagram, LLC* before the United States District Court Central District of California Western Division, Case No. 2:18-cv-01844-GW-KS, Document 57-2, Defendants' Reply In Support of Motion to Dismiss Re Invalidity Under 35 u_s_c_101, Indirect Infringement, and Willful Infringement, filed on Jul. 12, 2018, pp. 1-27.
*Blackberry Limited* v. *Facebook, Inc, Whatsapp Inc., Instagram, Inc., and Instagram, LLC; Blackberry Limited* v. *Snap Inc.,* "Defendants' Preliminary Proposed Claim Constructions," Case No. 2:18-cv-01844; 2:18-cv-02693, dated Jan. 17, 2019, 6 pages.
*Blackberry Limited* v. *Facebook, Inc, Whatsapp Inc., Instagram, Inc., and Instagram, LLC; Blackberry Limited* v. *Snap Inc.,* "Defendants' Preliminary Proposed Claim Constructions: Exhibit A," Case No. 2:18-cv-01844; 2:18-cv-02693, dated Jan. 17, 2019, 3 pages.
*Blackberry Limited* v. *Facebook, Inc, Whatsapp Inc., Instagram, Inc., and Instagram, LLC; Blackberry Limited* v. *Snap Inc.,* "Defendants' Preliminary Proposed Claim Constructions: Exhibit B," Case No. 2:18-cv-01844; 2:18-cv-02693, dated Jan. 17, 2019, 5 pages.
*Blackberry Limited* v. *Facebook, Inc, Whatsapp Inc., Instagram, Inc., and Instagram, LLC; Blackberry Limited* v. *Snap Inc.,* "Defendants' Preliminary Proposed Claim Constructions: Exhibit C," Case No. 2:18-cv-01844; 2:18-cv-02693, dated Jan. 17, 2019, 2 pages.
*Blackberry Limited* v. *Facebook, Inc, Whatsapp Inc., Instagram, Inc., and Instagram, LLC; Blackberry Limited* v. *Snap Inc.,* "Blackberry Limited's Proposed Claim Constructions Pursuant to S.P.R. 3.2," Case No. 2:18-cv-01844; 2:18-cv-02693, dated Jan. 17, 2019, 52 pages.
*Blackberry Limited* v. *Facebook, Inc, Whatsapp Inc., Instagram, Inc., and Instagram, LLC; Blackberry Limited* v. *Snap Inc.,* "Declaration of Aviel Rubin, Ph.D Regarding Claim Construction of the '961 Patent (with Exhibits)," Case No. 2:18-cv-01844; 2:18-cv-02693, dated Jan. 17, 2019, 40 pages.
*Blackberry Limited* v. *Facebook, Inc, Whatsapp Inc., Instagram, Inc., and Instagram, LLC; Blackberry Limited* v. *Snap Inc.,* "Declaration of Craig Rosenberg, Ph.D Regarding Claim Construction (with Exhibits)," Case No. 2:18-cv-01844; 2:18-cv-02693, dated Jan. 17, 2019, 38 pages.
*Blackberry Limited* v. *Facebook, Inc, Whatsapp Inc., Instagram, Inc., and Instagram, LLC; Blackberry Limited* v. *Snap Inc.,* "Declaration of Joseph J. LaViola, Jr., Ph.D Regarding Claim Construction (with Exhibits)," Case No. 2:18-cv-01844; 2:18-cv-02693, dated Jan. 17, 2019, 57 pages.
*Blackberry Limited* v. *Facebook, Inc, Whatsapp Inc., Instagram, Inc., and Instagram, LLC; Blackberry Limited* v. *Snap Inc.,* "Declaration of Kevin Almeroth, Ph.D Regarding Claim Construction (with Exhibits)," Case No. 2:18-cv-01844; 2:18-cv-02693, dated Jan. 17, 2019, 119 pages.
*Blackberry Limited* v. *Facebook, Inc, Whatsapp Inc., Instagram, Inc., and Instagram, LLC; Blackberry Limited* v. *Snap Inc.,* "Declaration of Patrick McDaniel, Ph.D Regarding Claim Construction (with Exhibits)," Case No. 2:18-cv-01844; 2:18-cv-02693, dated Jan. 17, 2019, 62 pages.
*Blackberry Limited* v. *Facebook, Inc, Whatsapp Inc., Instagram, Inc., and Instagram, LLC; Blackberry Limited* v. *Snap Inc.,* "In Chambers- Final Ruling on Facebook Defendants' Motion to Dismiss," Case No. 18-cv-01844; 2:18-cv-02693, dated Aug. 21, 2018, 28 pages.
*Blackberry Limited* v. *Facebook, Inc, Whatsapp Inc., Instagram, Inc., and Instagram, LLC; Blackberry Limited* v. *Snap Inc.,* "Joint Statement Regarding Disputed Claims Terms," Case No. 2:18-cv-01844; 2:18-cv-02693, dated Mar. 26, 2019, 12 pages.
*Blackberry Limited* v. *Facebook, Inc., et al.,* "Balakrishnan Invalidity Report—Appendix C," Case Nos. 2:18-CV-01844-GW-KS, Oct. 21, 2019, 37 pages.
*Blackberry Limited* v. *Facebook, Inc., et al.,* "Balakrishnan Invalidity Report—Appendix E," Case Nos. 2:18-CV-01844-GW-KS, Oct. 21, 2019, 69 pages.
*Blackberry Limited* v. *Facebook, Inc., et al.,* "Balakrishnan Invalidity Report—Appendix G," Case Nos. 2:18-CV-01844-GW-KS, Oct. 21, 2019, 21 pages.
*Blackberry Limited* v. *Facebook, Inc., et al.,* "Balakrishnan Invalidity Report—Appendixes A-B," Case Nos. 2:18-CV-01844-GW-KS, Oct. 21, 2019, 206 pages.
*Blackberry Limited* v. *Facebook, Inc., et al.,* "Blackberry's Opening Claim Construction Brief," Case Nos. 2:18-CV-01844-GW-KS (Lead Consolidated Case) and 2:18-CV-02693-GW-KS (C.D. Cal.), Mar. 21, 2019, 47 pages.
*Blackberry Limited* v. *Facebook, Inc., et al.,* "Blackberry's Responsive Claim Construction Brief," Case Nos. 2:18-CV-01844-GW-KS (Lead Consolidated Case) and 2:18-CV-02693-GW-KS (C.D. Cal.), Mar. 18, 2019, 23 pages.
*Blackberry Limited* v. *Facebook, Inc., et al.,* "Blackberry's Technology Tutorial and Claim Construction Presentation," Case Nos. 2:18-CV-01844-GW-KS (Lead Consolidated Case) and 2:18-CV-02693-GW-KS (C.D. Cal.), Mar. 18, 2019, 3 pages.
*Blackberry Limited* v. *Facebook, Inc., et al.,* "Civil Minutes: In Chambers—Final Rulings," Case Nos. 2:18-CV-01844-GW-KS (Lead Consolidated Case) and 2:18-CV-02693-GW-KS (C.D. Cal.), Oct. 1, 2019, 56 pages [redacted].
*Blackberry Limited* v. *Facebook, Inc., et al.,* "Declaration of Jeff Nardinelli in Suport of Blackberry's Responsive Claim Construction Brief," Case Nos. 2:18-CV-01844-GW-KS (Lead Consolidated Case) and 2:18-CV-02693-GW-KS (C.D. Cal.), Mar. 18, 2019, 3 pages.
*Blackberry Limited* v. *Facebook, Inc., et al.,* "Declaration of Jeff Nardinelli In Support Of Blackberry's Opening Claim Construction Brief," Case Nos. 2:18-CV-01844-GW-KS (Lead Consolidated Case) and 2:18-CV-02693-GW-KS (C.D. Cal.), Mar. 21, 2019, 3 pages.
*Blackberry Limited* v. *Facebook, Inc., et al.,* "Declaration of Matthew J. Brigham in Support of Defendants' Opening Claim Construction Brief for Common Patents," Case Nos. 2:18-CV-01844-GW-KS, Feb. 28, 2019, 4 pages.
*Blackberry Limited* v. *Facebook, Inc., et al.,* "Declaration of Matthew J. Brigham in Support of Defendants' Responsive Claim Construction Brief (Common Patents)," Case Nos. 2:18-CV-01844-GW-KS (Lead Consolidated Case) and 2:18-CV-02693-GW-KS (C.D. Cal.), Mar. 18, 2019, 2 pages.
*Blackberry Limited* v. *Facebook, Inc., et al.,* "Declaration of Matthew J. Brigham in Support of Facebook Defendants' Opening Claim Construction Brief (Facebook-Only Patents)," Case No. 2:18-CV-01844-GW-KS (C.D. Cal.), Feb. 28, 2019, 3 pages.

(56) References Cited

OTHER PUBLICATIONS

*Blackberry Limited* v. *Facebook, Inc., et al.,* "Declaration of Matthew J. Brigham in Support of Facebook Defendants' Responsive Claim Construction Brief (Facebook-Only Patents)," Case Nos. 2:18-CV-01844-GW-KS (C.D. Cal.), Mar. 18, 2019, 2 pages.
*Blackberry Limited* v. *Facebook, Inc., et al.,* "Defendants' Opening Claim Construction Brief for Common Patents," Case Nos. 2:18-CV-01844-GW-KS (Lead Consolidated Case) and 2:18-CV-02693-GW-KS (C.D. Cal.), Feb. 28, 2019, 29 pages.
*Blackberry Limited* v. *Facebook, Inc., et al.,* "Defendants' Responsive Claim Construction Brief (Common Patents)," Case Nos. 2:18-CV-01844-GW-KS (Lead Consolidated Case) and 2:18-CV-02693-GW-KS (C.D. Cal.), Mar. 18, 2019, 14 pages.
*Blackberry Limited* v. *Facebook, Inc., et al.,* "Defendants' Tutorial and Claim Construction Presentation (Common Patents)," Case Nos. 2:18-CV-01844-GW-KS (Lead Consolidated Case) and 2:18-CV-02693-GW-KS (C.D. Cal.), Mar. 21, 2019, 210 pages [slides].
*Blackberry Limited* v. *Facebook, Inc., et al.,* "Defendants' Tutorial and Claim Construction Presentation (Facebook Only Patents)," Case Nos. 2:18-CV-01844-GW-KS, Mar. 21, 2019, 61 pages [slides].
*Blackberry Limited* v. *Facebook, Inc., et al.,* "Defendants' Tutorial and Claim Construction Presentation (Facebook-Only Patents)," Case Nos. 2:18-CV-01844-GW-KS (C.D. Cal.), Mar. 18, 2019, 2 pages.
*Blackberry Limited* v. *Facebook, Inc., et al.,* "Exhibit D1- Defendants' Invalidity Contentions," Case 2:18-CV-01844-GW-KS (C.D. Cal.), Oct. 29, 2018, 40 pages.
*Blackberry Limited* v. *Facebook, Inc., et al.,* "Exhibit D10-Defendants' Invalidity Contentions," Case 2:18-CV-01844-GW-KS (C.D. Cal.), Oct. 29, 2018, 29 pages.
*Blackberry Limited* v. *Facebook, Inc., et al.,* "Exhibit D11-Defendants' Invalidity Contentions," Case 2:18-CV-01844-GW-KS (C.D. Cal.), Oct. 29, 2018, 28 pages.
*Blackberry Limited* v. *Facebook, Inc., et al.,* "Exhibit D12-Defendants' Invalidity Contentions," Case 2:18-CV-01844-GW-KS (C.D. Cal.), Oct. 29, 2018, 40 pages.
*Blackberry Limited* v. *Facebook, Inc., et al.,* "Exhibit D13-Defendants' Invalidity Contentions," Case 2:18-CV-01844-GW-KS (C.D. Cal.), Oct. 29, 2018, 46 pages.
*Blackberry Limited* v. *Facebook, Inc., et al.,* "Exhibit D14-Defendants' Invalidity Contentions," Case 2:18-CV-01844-GW-KS (C.D. Cal.), Oct. 29, 2018, 58 pages.
*Blackberry Limited* v. *Facebook, Inc., et al.,* "Exhibit D15-Defendants' Invalidity Contentions," Case 2:18-CV-01844-GW-KS (C.D. Cal.), Oct. 29, 2018, 29 pages.
*Blackberry Limited* v. *Facebook, Inc., et al.,* "Exhibit D16-Defendants' Invalidity Contentions," Case 2:18-CV-01844-GW-KS (C.D. Cal.), Oct. 29, 2018, 69 pages.
*Blackberry Limited* v. *Facebook, Inc., et al.,* "Exhibit D17-Defendants' Invalidity Contentions," Case 2:18-CV-01844-GW-KS (C.D. Cal.), Oct. 29, 2018, 71 pages.
*Blackberry Limited* v. *Facebook, Inc., et al.,* "Exhibit D18-Defendants' Invalidity Contentions," Case 2:18-CV-01844-GW-KS (C.D. Cal.), Oct. 29, 2018, 49 pages.
*Blackberry Limited* v. *Facebook, Inc., et al.,* "Exhibit D19-Defendants' Invalidity Contentions," Case 2:18-CV-01844-GW-KS (C.D. Cal.), Oct. 29, 2018, 41 pages.
*Blackberry Limited* v. *Facebook, Inc., et al.,* "Exhibit D2-Defendants' Invalidity Contentions," Case 2:18-CV-01844-GW-KS (C.D. Cal.), Oct. 29, 2018, 97 pages.
*Blackberry Limited* v. *Facebook, Inc., et al.,* "Exhibit D20-Defendants' Invalidity Contentions," Case 2:18-CV-01844-GW-KS (C.D. Cal.), Oct. 29, 2018, 49 pages.
*Blackberry Limited* v. *Facebook, Inc., et al.,* "Exhibit D21-Defendants' Invalidity Contentions," Case 2:18-CV-01844-GW-KS (C.D. Cal.), Oct. 29, 2018, 91 pages.
*Blackberry Limited* v. *Facebook, Inc., et al.,* "Exhibit D22-Defendants' Invalidity Contentions," Case 2:18-CV-01844-GW-KS (C.D. Cal.), Oct. 29, 2018, 32 pages.
*Blackberry Limited* v. *Facebook, Inc., et al.,* "Exhibit D23-Defendants' Invalidity Contentions," Case 2:18-CV-01844-GW-KS (C.D. Cal.), Oct. 29, 2018, 65 pages.
*Blackberry Limited* v. *Facebook, Inc., et al.,* "Exhibit D24-Defendants' Invalidity Contentions," Case 2:18-CV-01844-GW-KS (C.D. Cal.), Oct. 29, 2018, 59 pages.
*Blackberry Limited* v. *Facebook, Inc., et al.,* "Exhibit D25-Defendants' Invalidity Contentions," Case 2:18-CV-01844-GW-KS (C.D. Cal.), Oct. 29, 2018, 35 pages.
*Blackberry Limited* v. *Facebook, Inc., et al.,* "Exhibit D26-Defendants' Invalidity Contentions," Case 2:18-CV-01844-GW-KS (C.D. Cal.), Oct. 29, 2018, 31 pages.
*Blackberry Limited* v. *Facebook, Inc., et al.,* "Exhibit D27-Defendants' Invalidity Contentions," Case 2:18-CV-01844-GW-KS (C.D. Cal.), Oct. 29, 2018, 21 pages.
*Blackberry Limited* v. *Facebook, Inc., et al.,* "Exhibit D28-Defendants' Invalidity Contentions," Case 2:18-CV-01844-GW-KS (C.D. Cal.), Oct. 29, 2018, 33 pages.
*Blackberry Limited* v. *Facebook, Inc., et al.,* "Exhibit D29-Defendants' Invalidity Contentions," Case 2:18-CV-01844-GW-KS (C.D. Cal.), Oct. 29, 2018, 44 pages.
*Blackberry Limited* v. *Facebook, Inc., et al.,* "Exhibit D3-Defendants' Invalidity Contentions," Case 2:18-CV-01844-GW-KS (C.D. Cal.), Oct. 29, 2018, 21 pages.
*Blackberry Limited* v. *Facebook, Inc., et al.,* "Exhibit D30-Defendants' Invalidity Contentions," Case 2:18-CV-01844-GW-KS (C.D. Cal.), Oct. 29, 2018, 36 pages.
*Blackberry Limited* v. *Facebook, Inc., et al.,* "Exhibit D31-Defendants' Invalidity Contentions," Case 2:18-CV-01844-GW-KS (C.D. Cal.), Oct. 29, 2018, 32 pages.
*Blackberry Limited* v. *Facebook, Inc., et al.,* "Exhibit D32-Defendants' Invalidity Contentions," Case 2:18-CV-01844-GW-KS (C.D. Cal.), Oct. 29, 2018, 30 pages.
*Blackberry Limited* v. *Facebook, Inc., et al.,* "Exhibit D33-Defendants' Invalidity Contentions," Case 2:18-CV-01844-GW-KS (C.D. Cal.), Oct. 29, 2018, 27 pages.
*Blackberry Limited* v. *Facebook, Inc., et al.,* "Exhibit D34-Defendants' Invalidity Contentions," Case 2:18-CV-01844-GW-KS (C.D. Cal.), Oct. 29, 2018, 24 pages.
*Blackberry Limited* v. *Facebook, Inc., et al.,* "Exhibit D35-Defendants' Invalidity Contentions," Case 2:18-CV-01844-GW-KS (C.D. Cal.), Oct. 29, 2018, 22 pages.
*Blackberry Limited* v. *Facebook, Inc., et al.,* "Exhibit D36-Defendants' Invalidity Contentions," Case 2:18-CV-01844-GW-KS (C.D. Cal.), Oct. 29, 2018, 34 pages.
*Blackberry Limited* v. *Facebook, Inc., et al.,* "Exhibit D37-Defendants' Invalidity Contentions," Case 2:18-CV-01844-GW-KS (C.D. Cal.), Oct. 29, 2018, 42 pages.
*Blackberry Limited* v. *Facebook, Inc., et al.,* "Exhibit D38-Defendants' Invalidity Contentions," Case 2:18-CV-01844-GW-KS (C.D. Cal.), Oct. 29, 2018, 58 pages.
*Blackberry Limited* v. *Facebook, Inc., et al.,* "Exhibit D39-Defendants' Invalidity Contentions," Case 2:18-CV-01844-GW-KS (C.D. Cal.), Oct. 29, 2018, 12 pages.
*Blackberry Limited* v. *Facebook, Inc., et al.,* "Exhibit D4-Defendants' Invalidity Contentions," Case 2:18-CV-01844-GW-KS (C.D. Cal.), Oct. 29, 2018, 24 pages.
*Blackberry Limited* v. *Facebook, Inc., et al.,* "Exhibit 40-Defendants' Invalidity Contentions," Case 2:18-CV-01844-GW-KS (C.D. Cal.), Oct. 29, 2018, 14 pages.
*Blackberry Limited* v. *Facebook, Inc., et al.,* "Exhibit D5-Defendants' Invalidity Contentions," Case 2:18-CV-01844-GW-KS (C.D. Cal.), Oct. 29, 2018, 24 pages.
*Blackberry Limited* v. *Facebook, Inc., et al.,* "Exhibit D6-Defendants' Invalidity Contentions," Case 2:18-CV-01844-GW-KS (C.D. Cal.), Oct. 29, 2018, 42 pages.
*Blackberry Limited* v. *Facebook, Inc., et al.,* "Exhibit D7-Defendants' Invalidity Contentions," Case 2:18-CV-01844-GW-KS (C.D. Cal.), Oct. 29, 2018, 66 pages.
*Blackberry Limited* v. *Facebook, Inc., et al.,* "Exhibit D8-Defendants' Invalidity Contentions," Case 2:18-CV-01844-GW-KS (C.D. Cal.), Oct. 29, 2018, 70 pages.

(56) References Cited

OTHER PUBLICATIONS

*Blackberry Limited* v. *Facebook, Inc., et al.,* "Exhibit D9-Defendants' Invalidity Contentions," Case 2:18-CV-01844-GW-KS (C.D. Cal.), Oct. 29, 2018, 29 pages.
*Blackberry Limited* v. *Facebook, Inc., et al.,* "Expert Report of Craig Rosenberg, Ph.D. Regarding: (1) Infringement of U.S. Pat. No. 9,349,120; (2) Infringement of U.S. Pat. No. 8,301,713," Case Nos. 2:18-CV-01844-GW-KS, Oct. 21, 2019, 393 pages [redacted].
*Blackberry Limited* v. *Facebook, Inc., et al.,* "Expert Report of Craig Rosenberg, Ph.D. Regarding: (1) Validity of U.S. Pat. No. 9,349,120; (2) Validity of U.S. Pat. No. 8,301,713," Case Nos. 2:18-CV-01844-GW-KS, Oct. 21, 2019, 139 pages [redacted].
*Blackberry Limited* v. *Facebook, Inc., et al.,* "Expert Report of Ravin Balakrishnan, Ph.D.Regarding Invalidity of U.S. Pat. Nos. 8,209,634, 8,301,713, 8,279,173 and 9,349,120," Case Nos. 2:18-CV-01844-GW-KS, Oct. 21, 2019, 269 pages [redacted].
*Blackberry Limited* v. *Facebook, Inc., et al.,* "Expert Report of Sylvia Hall-Ellis, Ph.D. Regarding Invalidity of U.S. Pat. Nos. 8,209,634, 8,301,713,7,372,961, and 8,677,250," Case Nos. 2:18-CV-01844-GW-KS, Oct. 3, 2019, 33 pages [redacted].
*Blackberry Limited* v. *Facebook, Inc., et al.,* "Facebook Defendants' Opening Claim Construction Brief (Facebook-Only Patents)," Case No. 2:18-CV-01844-GW-KS (C.D. Cal.), Feb. 28, 2019, 11 pages.
*Blackberry Limited* v. *Facebook, Inc., et al.,* "Facebook Defendants' Responsive Claim Construction Brief (Facebook-Only Patents)," Case Nos. 2:18-CV-01844-GW-KS, Mar. 18, 2019, 6 pages.
*Blackberry Limited* v. *Facebook, Inc., et al.,* "First Amended Complaint for Patent Infringement," Case 2:18-CV-01844 (C.D. Cal.), U.S. Pat. No. 8,209,634, dated Apr. 8, 2018, 160 pages.
*Blackberry Limited* v. *Facebook, Inc., et al.,* "Proof of Service," Case 2:18-CV-01844 (C.D. Cal.), U.S. Pat. No. 8,209,634, dated Apr. 9, 2018, 4 pages.
*Blackberry Limited* v. *Facebook, Inc., et al.,* "Rebuttal Declaration of Aviel Rubin, Ph.D regarding Claim Construction of the '961 Patent," Case Nos. 2:18-CV-01844-GW-KS (Lead Consolidated Case) and 2:18-CV-02693-GW-KS (C.D. Cal.), Mar. 18, 2019, 3 pages.
*Blackberry Limited* v. *Facebook, Inc., et al.,* "Rebuttal Declaration of Craig Rosenberg, Ph.D regarding Claim Construction," Case Nos. 2:18-CV-01844-GW-KS (Lead Consolidated Case) and 2:18-CV-02693-GW-KS (C.D. Cal.), Mar. 18, 2019, 3 pages.
*Blackberry Limited* v. *Facebook, Inc., et al.,* "Rebuttal Declaration of Joseph Laviola, Ph.D regarding Claim Construction," Case Nos. 2:18-CV-01844-GW-KS (Lead Consolidated Case) and 2:18-CV-02693-GW-KS (C.D. Cal.), Mar. 18, 2019, 4 pages.
*Blackberry Limited* v. *Facebook, Inc., et al.,* "Rebuttal Declaration of Kevin Almeroth, Ph.D regarding Claim Construction," Case Nos. 2:18-CV-01844-GW-KS (Lead Consolidated Case) and 2:18-CV-02693-GW-KS (C.D. Cal.), Mar. 19, 2019, 7 pages.
*Blackberry Limited* v. *Facebook, Inc., et al.,* "Snap's Opening Claim Construction Brief," Case Nos. 2:18-CV-01844-GW-KS (Lead Consolidated Case) and 2:18-CV-02693-GW-KS (C.D. Cal.), Feb. 28, 2019, 6 pages.
*Blackberry Limited* v. *Facebook, Inc., et al.,* "Snap's Responsive Claim Construction Brief," Case Nos. 2:18-CV-01844-GW-KS (Lead Consolidated Case) and 2:18-CV-02693-GW-KS (C.D. Cal.), Mar. 18, 2019, 4 pages.
*Blackberry Limited* v. *Facebook, Inc., et al.,* "Snap's Tutorial and Claim Construction Presentation," Case Nos. 2:18-CV-01844-GW-KS (Lead Consolidated Case) and 2:18-CV-02693-GW-KS (C.D. Cal.), Mar. 18, 2019, 2 pages.
*Blackberry Limited* v. *Facebook, Inc., et al.,* "Supplemental Declaration of Patrick McDaniel, Ph.D regarding Claim Construction," Case Nos. 2:18-CV-01844-GW-KS (Lead Consolidated Case) and 2:18-CV-02693-GW-KS (C.D. Cal.), Mar. 18, 2019, 6 pages.
*Blackberry Limited* v. *Facebook, Inc., et al.,* Defendant's Memorandum in Support of Motion form Summary Judgment and Motion to Strike, Case 2:18-CV-01844GW, dated Jan. 7, 2020, 35 pages.
*Blackberry Limited* v. *Facebook, Inc., et al.; Blackberry Limited* v. *Snap Inc.,* "BlackBerry's Technology Tutorial," Case Nos. 2:18-CV-01844-GW-KS (Lead Consolidated Case) and 2:18-CV-02693-GW-KS (C.D. Cal.), Mar. 21, 2019, 112 pages [slides].
*Blackberry Limited* v. *Facebook, Inc., et al.; Blackberry Limited* v. *Snap Inc.,* "Claim Construction Hearing," Case Nos. 2:18-CV-01844-GW-KS (Lead Consolidated Case) and 2:18-CV-02693-GW-KS (C.D. Cal.), Mar. 21, 2019, 238 pages [slides].
*Blackberry Limited* v. *Facebook, Inc., Whatsapp Inc., Instagram, Inc. and Instagram,LLC,* "Defendants' Invalidity Contentions Re U.S. Pat. Nos. 7,372,961; 8,279,173; 8,429,236; 8,677,250; 9,349,120," Case 2:18-CV-01844-GW-KS, Oct. 29, 2018, 189 pages.
*Blackberry Limited* v. *Facebook, Inc., Whatsapp Inc., Instagram, Inc. and Instagram,LLC; Blackberry Limited* v. *Snap Inc.,* "[Proposed] Order Granting Defendants' Motion to Stay Pending Inter Partes Review," Case 2:18-CV-01844-GW-KS; 2:18-CV-02693-GW-KS, Apr. 16, 2019, 2 pages.
*Blackberry Limited* v. *Facebook, Inc., Whatsapp Inc., Instagram, Inc. and Instagram,LLC; Blackberry Limited* v. *Snap Inc.,* "Civil Minutes—General," Case 2:18-CV-01844-GW-KS; 2:18-CV-02693-GW-KS, Apr. 1, 2019, 41 pages.
*Blackberry Limited* v. *Facebook, Inc., Whatsapp Inc., Instagram, Inc. and Instagram,LLC; Blackberry Limited* v. *Snap Inc.,* "Civil Minutes—General," Case 2:18-CV-01844-GW-KS; 2:18-CV-02693-GW-KS, Apr. 5, 2019, 51 pages.
*Blackberry Limited* v. *Facebook, Inc., Whatsapp Inc., Instagram, Inc. and Instagram,LLC; Blackberry Limited* v. *Snap Inc.,* "Civil Minutes—General," Case 2:18-CV-01844-GW-KS; 2:18-CV-02693-GW-KS, Mar. 27, 2019, 4 pages.
*Blackberry Limited* v. *Facebook, Inc., Whatsapp Inc., Instagram, Inc. and Instagram,LLC; Blackberry Limited* v. *Snap Inc.,* "Civil Minutes- Status Conference," Case 2:18-CV-01844-GW-KS; 2:18-CV-02693-GW-KS, Apr. 22, 2019, 2 pages.
*Blackberry Limited* v. *Facebook, Inc., Whatsapp Inc., Instagram, Inc. and Instagram,LLC; Blackberry Limited* v. *Snap Inc.,* "Claim Construction Hearing," Case 2:18-CV-01844-GW-KS; 2:18-CV-02693-GW-KS, Apr. 1, 2019, 67 pages.
*Blackberry Limited* v. *Facebook, Inc., Whatsapp Inc., Instagram, Inc. and Instagram,LLC; Blackberry Limited* v. *Snap Inc.,* "Corrected Final Ruling on Claim Construction," Case 2:18-CV-01844-GW-KS; 2:18-CV-02693-GW-KS, Apr. 5, 2019, 43 pages.
*Blackberry Limited* v. *Facebook, Inc., Whatsapp Inc., Instagram, Inc. and Instagram,LLC; Blackberry Limited* v. *Snap Inc.,* "Defendants' Joint Invalidity Contentions Re U.S. Pat. Nos. 8,209,634; 8,307,713; 8,296,351; and 8,676,929," Case 2:18-CV-01844-GW-KS; 2:18-CV-02693-GW-KS, Oct. 29, 2018, 152 pages.
*Blackberry Limited* v. *Facebook, Inc., Whatsapp Inc., Instagram, Inc. and Instagram,LLC; Blackberry Limited* v. *Snap Inc.,* "Defendants' Memorandum of Points and Authorities in Support of Motion to Stay Pending Inter Partes Review," Case 2:18-CV-01844-GW-KS; 2:18-CV-02693-GW-KS, Apr. 16, 2019, 31 pages.
*Blackberry Limited* v. *Facebook, Inc., Whatsapp Inc., Instagram, Inc. and Instagram,LLC; Blackberry Limited* v. *Snap Inc.,* "Defendants' Notice and Motion to Stay Pending Inter Partes Review," Case 2:18-CV-01844-GW-KS; 2:18-CV-02693-GW-KS, Apr. 16, 2019, 5 pages.
*Blackberry Limited* v. *Facebook, Inc., Whatsapp Inc., Instagram, Inc. and Instagram,LLC; Blackberry Limited* v. *Snap Inc.,* "Defendant's Presentation," Case 2:18-CV-01844-GW-KS; 2:18-CV-02693-GW-KS, Apr. 1, 2019, 161 pages.
*Blackberry Limited* v. *Facebook, Inc., Whatsapp Inc., Instagram, Inc. and Instagram,LLC; Blackberry Limited* v. *Snap Inc.,* "In Chambers—Order," Case 2:18-CV-01844-GW-KS; 2:18-CV-02693-GW-KS, May 15, 2019, 3 pages.
*Blackberry Limited* v. *Facebook, Inc., Whatsapp Inc., Instagram, Inc. and Instagram,LLC; Blackberry Limited* v. *Snap Inc.,* "Joint Report in Response to Court Minute Order (Dkt. 138) Regarding Disputed Claim Terms," Case 2:18-CV-01844-GW-KS; 2:18-CV-02693-GW-KS, Mar. 28, 2019, 12 pages.
*Blackberry Limited* v. *Facebook, Inc., Whatsapp Inc., Instagram, Inc. and Instagram,LLC; Blackberry Limited* v. *Snap Inc.,* "Joint Statement Regarding Disputed Claim Terms," Case 2:18-CV-01844- GW-KS; 2:18-CV-02693-GW-KS, Mar. 26, 2019, 12 pages.
*Blackberry Limited* v. *Facebook, Inc., Whatsapp Inc., Instagram, Inc. and Instagram,LLC; Blackberry Limited* v. *Snap Inc.,* "Notice

(56) References Cited

OTHER PUBLICATIONS

Withdrawing Pre-Institution Motion to Stay In View of Court's Guidance," Case 2:18-CV-01844-GW-KS; 2:18-CV-02693-GW-KS, Apr. 22, 2019, 2 pages.
*Blackberry Limited* v. *Facebook, Inc., Whatsapp Inc., Instagram, Inc. and Instagram,LLC; Blackberry Limited* v. *Snap Inc.,* "Tutorial Hearing Transcript," Case 2:18-CV-01844-GW-KS; 2:18-CV-02693-GW-KS, Mar. 21, 2019, 154 pages.
*BlackBerry Limited* v. *Snap, Inc.,* before the United States District Court Central District of California, Western Division, Case No. 2:18-cv-02693-GW(KSx), Document 41, Reply Memorandum In Support of SNAP Inc.'s Motion to Dismiss Pursuant to FRCP 12(b)(6), filed on Jul. 12, 2018, pp. 1-31.
*BlackBerry Limited* v. *Snap, Inc.,* before the United States District Court for the Central District of California, Case No. 2 :18-cv-02693-GW(KSx), Document 38, BlackBerry Limited's Opposition to Defendant's Motion To Dismiss Filed on Jun. 28, 2018, pp. 1-26.
*BlackBerry Limited* v. *Snap, Inc.,* before the United States District Court for the Central District of California, Case No. 2:18-cv-02693-GW(KSx), Document 39, BlackBerry Limited's Opposition to Defendant's Motion To Dismiss Filed on Jun. 28, 2018, pp. 1-11.
*BlackBerry Limited* v.*Facebook, Inc.,* a Delaware corporation, Whatsapp Inc., a Delaware corporation, and Instagram, Inc., a Delaware corporation, and Inst Agram, LLC, a Delaware limited liability company, before the United States District Court for the Central District of California, Case No. 2: 18-cv-01844 GW(KSx), , Document 4 7, BlackBerry Limited's Opposition to Defendants' Motions To Dismiss, filed on Jun. 28, 2018, pp. 1-26.
Building Internet Firewalls, 2nd Ed., Jun. 2000, 542 pages.
Cnet, "IBM ThinkPad 240 2609- 10.4"—Celeron A—Win98—64MB RAM—6.4 GB HDD Series," retrieved on Sep. 17, 2018, http://www.cnet.com/products/ibm-thinkpad-240-2609-10-4-celeron-a-win98-64-mb-ram-6-4-GB-hdd-series/specs/, 3 pages.
Coding Theory and Cryptography: the essentials, 2nd Ed., 2000, 94 and 237.
Collins Dictionary, William Collins Sons & Co. Ltd and HarperCollins Publishers, Tenth Edition, 2009, 1299, 1378.
Collins Dictionary, William Collins Sons & Co. Ltd and HarperCollins Publishers, Tenth Edition, 2009, 16, 457, 837, and 948-949.
Collins Dictionary, William Collins Sons & Co. Ltd and HarperCollins Publishers, Tenth Edition, 2009, 16, 458.
Collins Dictionary, William Collins Sons & Co. Ltd and HarperCollins Publishers, Tenth Edition, 2009, 823.
Complaint for Patent Infringement filed by BlackBerry Limited against Facebook, Inc., Whatsapp Inc., and Instagram, Inc. in the U.S. District Court for the Central District of California, Case No. 2:18-CV-01844, filed on Mar. 6, 2018.
Complaint for Patent Infringement filed by BlackBerry Limited against Snap, Inc., in the U.S. District Court for the Central District of California, Case No. 2:18-CV-02693, filed on Apr. 3, 2018.
Comprehensive Dictionary of Electrical Engineering, 2nd Ed., 2005, 351.
Decision Institution of Inter Partes Review 37 C.F.R. § 42.108 of U.S. Pat. No. 8,745,149, *Google Inc.* v. *BlackBerry Ltd.,* filed on Feb. 16, 2017, before the USPTO Patent Trial and Appeal Board, Case IPR2017-00912 Patent 8,745,149 B2 entered on Aug. 30, 2017.
Decision Institution of Inter Partes Review of U.S. Pat. No. 8,745,149, *Google Inc.* v. *BlackBerry Ltd.,* filed on Feb. 16, 2017, before the USPTO PatentTrial and Appeal Board, Case IPR2017-00911Patent 8,745,149 B2 entered on Aug. 30, 2017.
Defendant's Notice and Motion to Stay Pending Inter Partes Review, *BlackBerry Limited* v. *Facebook, Inc. et al.* (Case Nos. 2:18-cv-01844-GW & 2:18-cv-02693-GW) (C.D. Cal. Apr. 16, 2019).
Derfler, Jr., "Instant Messaging: Chat Goes to Work," PC Magazine, Jan. 18, 2000, 19(2): 82-89.
Developing User Interfaces, "Graphical Interfaces," 1993, 85.
Dictionary of Computer and Internet Words, 2001, pp. 145-146 and 266.
Dictionary of Computer Science, Engineering, and Technology, 2000, 142, 214, 235.
Dictionary of Computer Science, Engineering, and Technology, 2000, 188.
Dictionary of Computer Science, Engineering, and Technology, 2000, 71, 102, and 503-504.
DiSabatino, "Lotus Debuts XSametime 2.5 Upgrade," Computerworld, Sep. 17, 2001, https://www.computerworld.com/article/2583151/appdevelopment/lotus-debuts-XSametime-2-5-upgrade.html, 4 pages.
Disabatino, "Microsoft to embed Messenger in Windows XP," CNN.com, Jun. 8, 2001, http://www.cnn.com/2001/TECH/ptech/06/08/xp.messenger.idg/, 2 pages.
EP Extended European Search Report in European Appln No. 19171697, dated Oct. 23, 2019, 9 pages.
EP Minutes of the Oral Proceedings in European Appeal No. T2661/14-3.5.05, European Appln. No. 10172832.7, dated May 14, 2019, 4 pages.
EP Notification re Decision of Technical Board of Appeal in EP Appln. No. 10172832.7, dated Jul. 24, 2019, decision dated May 8, 2019, 15 pages.
EP Summons to oral proceedings pursuant to Rule 115(1) EPC in European Application No. 10172832.7, Feb. 21, 2019 11 pages.
Erickson et al., "Socially Translucent Systems: Social Proxies, Persistent Conversation, and the Design of 'Babble'," CHI '99 Proceedings of the SIGCHI conference on Human Factors in Computing Systems, May 15-20, 1999, 20 pages.
Every Mac, "Apple PowerBook G4 1.0{T1} Specs," available on or before Apr. 20, 2012, https://everymac.com/systems/apple/powerbook_g4/specs/powerbook_g4_1.0.html, 3 pages.
Everymac, "Mac Specs: By Year: 2002," https://everymac.com/systems/by_year/macs-released-in-2002.html, 2 pages.
Exhibit 1 Applied Cryptography, 2nd Ed., 1996, 242-243.
Exhibit 10 Merriam Webster's Collegiate Dictionary, 11th ed, 2005, 795.
Exhibit 10 Response to U.S. Office Action in U.S. Appl. No. 10/784,781, dated Jan. 28, 2008, 11 pages.
Exhibit 11 The American Heritage College Dictionary, 4th Ed., 2002, 951.
Exhibit 11 U.S. Office Action in U.S. Appl. No. 10/784,781, dated Apr. 4, 2008, 14 pages.
Exhibit 12 Response to U.S. Office Action in U.S. Appl. No. 10/784,781, dated Jan. 22, 2009, 11 pages.
Exhibit 120.1 *Facebook, Inc., Instagram, LLC and Whatsapp Inc.,* v *Blackberry Limited,* "Declaration of Sandeep Chatterjee," IPR Review of U.S. Pat. No. 9,349,120B2, dated Feb. 18, 2019, 154 pages.
Exhibit 13 U.S. Office Action in U.S. Appl. No. 10/784,781, dated Apr. 8, 2009, 17 pages.
Exhibit 14 Response to U.S. Office Action in U.S. Appl. No. 10/784,781, dated Jun. 5, 2009, 11 pages.
Exhibit 15 Response to U.S. Office Action in U.S. Appl. No. 10/784,781, dated Jul. 8, 2009, 17 pages.
Exhibit 16 "Chapter 1: Getting to know your handheld," Blackberry Wireless Handheld User Manual, 2003, 34-38.
Exhibit 17 "Chapter 8: Reference," Blackberry Wireless Handheld User Manual, 2003, 135-139.
Exhibit 18 *Blackberry Limited* v. *Facebook, Inc, et al.* "Declaration of Craig Rosenberg, Ph.D Regarding Claim Construction," Case No. 2:18-cv-01844; 2:18-cv-02693, dated Jan. 17, 2019, 5 pages.
Exhibit 19 *Blackberry Limited* v. *Facebook, Inc., et al.,* "Videotaped Deposition Upon Oral Examination of Craig Rosenberg," Case Nos. 2:18-CV-01844-GW-KS (Lead Consolidated Case) and 2:18-CV-02693-GW-KS (C.D. Cal.), Feb. 8, 2019, 6 pages.
Exhibit 2 *Blackberry Limited* v. *Facebook, Inc., et al.,* "Declaration of Aviel Rubin, PhD. Regarding Claim Construction of the '961 Patent," Case No. 2:18-CV-01844-GW-KS (C.D. Cal.), Jan. 17, 2019, 5 pages.
Exhibit 2 U.S. Office Action in U.S. Appl. No. 10/784,781, dated May 19, 2011, 19 pages.
Exhibit 20 Dictionary of Computer and Internet Terms, 6th Ed., 1998, 376.
Exhibit 21 Random House Concise Dictionary of Science & Computers, 2004, 519.

(56) References Cited

OTHER PUBLICATIONS

Exhibit 22 *Blackberry Limited* v. *Facebook, Inc. et al.; Blackberry Limited* v. *Snap Inc.*, "Declaration of Kevin Almeroth, Ph.D regarding Claim Construction," Case No. 2:18-CV-002693 GW-KS, Jan. 17, 2019, 5 pages.
Exhibit 23 *Blackberry Limited* v. *Facebook, Inc. et al.; Blackberry Limited* v. *Snap Inc.*, "Videotaped Deposition of Kevin Almeroth, Ph.D ," Case No. 2:18-CV-02693 GW-KS, Feb. 6, 2019, 8 pages.
Exhibit 24 Microsoft Computer Dictionary, 4th Ed., 1999, 288, 289, and 435.
Exhibit 25 Dictionary of Computer and Internet Words, 2001, 172.
Exhibit 3 Applied Cryptography, 1st Ed., 1994, 198-199.
Exhibit 3 Response to U.S. Office Action in U.S. Appl. No. 10/784,781, dated Sep. 8, 2011, 28 pages.
Exhibit 327.1 *Blackberry Limited* v *Snap Inc.*, "Videotaped Deposition of Patrick McDaniel, Ph.D,", Case 2:18-CV-02693-GW-KS (C.D. Cal.), dated Feb. 5, 2019, 18 pages.
Exhibit 351.1 IEEE 100 The Authoritative Dictionary of IEEE Standards Terms, 7th Ed., 2000, 207 and 1031.
Exhibit 351.2 Modern Dictionary of Electronics, 7th Ed., 1999, 142 and 683.
Exhibit 351.3 Dictionary of Networking 3rd Ed., 1999, 336-337.
Exhibit 4 *Blackberry Limited* v *Snap Inc.*, "Videotaped Deposition of Joseph Laviola, Jr.,", Case 2:18-CV-02693-GW-KS (C.D. Cal.), dated Feb. 6, 2019, 7 pages.
Exhibit 5 *Blackberry Limited* v. *Facebook, Inc. et al.; Blackberry Limited* v. *Snap Inc.*, 1"Declaration of Joseph J. Laviola, Ph.D regarding Claim Construction," Case No. 2:18-CV-01844 GW-KS, Jan. 17, 2019, 7 pages.
Exhibit 5 The American Heritage College Dictionary, 4th Ed., 2002, 1129.
Exhibit 6 Illustrated Computer Dictionary for Dummies, 1993, 225.
Exhibit 6 Random House Webster's College Dictionary, 2nd Ed., 2000, 301 and 409.
Exhibit 634.1: Response to U.S. Office Action in U.S. Appl. No. 10/784,781 (U.S. Pat. No. 8,209,634), dated Sep. 8, 2011, 28 pages.
Exhibit 634.2: *Blackberry Limited* v. *Snap Inc.*, "Highly Confidential Subject to Protective Order Video-recorded Deposition of Mehrdad Jahangiri," Case Nos. 2:18-CV-01844-GW-KS (Lead Consolidated Case) and 2:18-CV-02693-GW-KS (C.D. Cal.), dated Jan. 30, 2019, 4 pages.
Exhibit 634.3 Collected Dictionary Definitions of Icon, McGraw-Hill Dictionary of Scientific and Technical Terms, 6th Ed., 2003, 1046; Hargrave's Communication Dictionary, 2001, 253; Dictionary of Computer Science, Engineering, and Technology, 2001, 235; Newton's Telecom Dictionary, Sixteenth and a Half Ed., 2000, 437; The Computer Glossary, 7thEd., 1995, 190; Random House Webster's Computer & Internet Dictionary, 3rd Ed., 1999, 267-268.
Exhibit 634.4 Response to U.S. Office Action in U.S. Appl. No. 10/784,781, dated Jan. 28, 2008, 11 pages.
Exhibit 7 *Blackberry Limited* v. *Facebook, Inc et al.; Blackberry Limited* v. *Snap Inc.*, "Declaration of Kevin Almeroth, Ph.D regarding Claim Construction," Case No. 2:18-CV-01844 GW-KS, Jan. 17, 2019, 5 pages.
Exhibit 7 U.S. After-Final Amendment and Summary of Interview in U.S. Appl. No. 10/784,781, dated Mar. 12, 2012, 20 pages.
Exhibit 713.1: *Blackberry Limited* v. *Snap Inc.*, "Videotaped Deposition Upon Oral Examination of Craig Rosenberg," Case Nos. 2:18-CV-01844-GW-KS (Lead Consolidated Case) and 2:18-CV-02693-GW-KS (C.D. Cal.), dated Feb. 8, 2019, 4 pages.
Exhibit 8 U.S. Notice of Allowability in U.S. Appl. No. 10/784,781, dated Mar. 18, 2012, 5 pages.
Exhibit 929.1 Weaver, "Signposts to Oblivion? Meta-Tags signal the Judiciary to stop commercial internet regulation and yield to the electronic marketplace," Seattle University Law Review: Regulating Meta Tags, 1998, 22: 667-694.
Exhibit 961.11 Response to U.S. Office Action in U.S. Appl. No. 10/025,924, dated Jul. 26, 2006, 8 pages.
Exhibit 961.12 IEEE 100 The Authoritative Dictionary of IEEE Standards Terms, 7th Ed., 2000, 7 pages.
Exhibit 961.14 The Computer Glossary: the Complete Illustrated Dictionary, 9th Ed., 1981, 150 and 252.
Exhibit 961.8 Merriam Webster's Collegiate Dictionary, 11th ed, 2005, 1004.
Exhibit A *Blackberry Limited* v *Facebook Inc., et al.*, "Defendants' Tutorial and Claim Construction Presentation (Facebook-Only Patent),", Case 2:18-CV-02693-GW-KS (C.D. Cal.), dated Mar. 18, 2019, 62 pages (slides).
Exhibit A *Blackberry Limited* v *Snap Inc.*, "Tutorial and Markman Presentation,", Case 2:18-CV-02693-GW-KS (C.D. Cal.), dated Mar. 18, 2019, 70 pages.
Exhibit A *Blackberry Limited* v *Snap Inc.*, "Videotaped Deposition of Kevin Almeroth, Ph.D,", Case 2:18-CV-02693-GW-KS (C.D. Cal.), dated Feb. 6, 2019, 13 pages.
Exhibit A Claims from U.S. Pat. No. 8,326,327, Hymel et al., dated Dec. 4, 2012, 3 pages.
Exhibit B *Blackberry Limited* v *Snap Inc.*, "Videotaped Deposition of Joseph Laviola, Jr.,", Case 2:18-CV-02693-GW-KS (C.D. Cal.), dated Feb. 6, 2019, 9 pages.
Exhibit B *Blackberry Limited* v. *Facebook, Inc., et al.*, "Rebuttal Declaration of Jonathan Katz, Ph.D Regarding Claim Construction of the '961 Patent," Case Nos. 2:18-CV-01844-GW-KS (C.D. Cal.), Mar. 18, 2019, 54 pages.
Exhibit B Response to Non-Final Office Action in U.S. Appl. No. 13/648,167, dated Apr. 2, 2014, 10 pages.
Exhibit C *Blackberry Limited* v *Snap Inc.*, "Videotaped Deposition Upon Oral Examination of Craig Rosenberg.,", Case 2:18-CV-01844-GW-KS (C.D. Cal.), dated Feb. 8, 2019, 7 pages.
Exhibit C *Blackberry Limited* v. *Facebook, Inc., et al.*, "Videotaped Deposition of Kevin Almeroth, Ph.D," Case Nos. 2:18-CV-02693-GW-KS (C.D. Cal.), Feb. 6, 2019, 8 pages.
Extended European Search Report issued in European Application No. 20215115.5 dated Jun. 14, 2021, 9 pages.
*Facebook, Inc., et al.* v. *Blackberry Limited,* Disclaimer in Patent Under 37 C.F.R. 1.321(a) in U.S. Pat. No. 8,301,713., Case IPR2019-00899, dated Dec. 31, 2019, 3 pages.
*Facebook, Inc., et al.* v. *Blackberry Limited,* Patent Owner's Response, Case IPR2019-00899, dated Dec. 31, 2019, 74 pages.
*Facebook, Inc., et al.* v. *Blackberry Limited,* Second Declaration of Rajeev Surati, Ph.D., Case IPR2019-00899, dated Dec. 31, 2019, 78 pages.
*Facebook, Inc., et al.* v. *Blackberry Limited,* vol. I Deposition of Sandeep Chatterjee, Ph.D., Case IPR2019-00899, dated Dec. 13, 2019, 102 pages.
*Facebook, Inc., Instagram, LLC and Whatsapp Inc,* v. *Blackberry Limited,* "Decision Instituting Inter Partes Review," IPR2019-00899, dated Oct. 8, 33 pages.
*Facebook, Inc., Instagram, LLC and Whatsapp Inc,* v. *Blackberry Limited,* "Declaration of Sylvia Hall-Ellis Ph.D.," IPR2019-00899, dated Mar. 27, 2019, 134 pages.
*Facebook, Inc., Instagram, LLC and Whatsapp Inc.* v. *Blackberry Limited,* Declaration of Rajeev Surati, Ph.D., Case No. IPR2019-00899, U.S. Pat. No. 8301713, dated Jul. 9, 2019, 57 pages.
*Facebook, Inc., Instagram, LLC and Whatsapp Inc.* v. *Blackberry Limited,* Declaration of Sandeep Chatterjee, Ph.D. in Support of Petition for Inter Partes Review, Case No. IPR2019-00899, U.S. Pat. No. 8301713, dated Mar. 29, 2019, 137 pages.
*Facebook, Inc., Instagram, LLC and Whatsapp Inc.* v. *Blackberry Limited,* Judgment: Final Written Decision, Case No. IPR2019-00899, U.S. Pat. No. 8301713, dated Oct. 5, 2020, 50 pages.
*Facebook, Inc., Instagram, LLC and Whatsapp Inc.* v. *Blackberry Limited,* Patent Owner's Preliminary Response, Case No. IPR2019-00899, U.S. Pat. No. 8301713, dated Jul. 9, 2019, 63 pages.
*Facebook, Inc., Instagram, LLC and Whatsapp Inc.* v. *Blackberry Limited,* Patent Owner's Sur-Reply, Case No. IPR2019-00899, U.S. Pat. No. 8301713, dated May 5, 2020, 31 pages.
*Facebook, Inc., Instagram, LLC and Whatsapp Inc.* v. *Blackberry Limited,* Petition for Inter Partes Review, Case No. IPR2019-00899, U.S. Pat. No. 8,301,713, dated Mar. 29, 2019, 83 pages.
*Facebook, Inc., Instagram, LLC and Whatsapp Inc.* v. *Blackberry Limited,* Videoconference Deposition of Sandeep Chatterjee, Ph.D., Case No. IPR2019-00899, U.S. Pat. No. 8,301,713, dated Apr. 29, 2020, 30 pages.

(56) References Cited

OTHER PUBLICATIONS

Feiler, "Mac OS X: The Complete Reference," Osborne/McGraw-Hill, 2001, 369 pages.
First Amended Complaint for Patent Infringement filed by Plaintiff BlackBerry Limited against Facebook, Inc., Whatsapp Inc., and Instagram, Inc. in the U.S. District Court for the Central District of California, Case No. 2:18-CV-01844, filed on Apr. 4, 2018.
Fitzgerald, "ichat Offers Netscape Plug-in for Truly Interactive Web Integrated Chat Sessions," ichat News Release, Nov. 6, 1996, http://web.archive.org/web/19961106090516/http://www.ichat.com/press1.html, 2 pages.
Foldoc, "mod," Jul. 1999, http://foldoc.org/, 2 pages.
Foldoc, "modulo operator," Jul. 1999, http://foldoc.org/, 2 pages.
Foundations on Cryptography, vol. I Basic Tools, "3.3.1. Standard Definition of Pseudorandom Generators," 2001, 4 pages.
Gabber, "The GNOME Jabber QE," Feb. 16, 2003, https://web.archive.org/web/20030216144351/http://gabber.sourceforge.net/, 4 pages.
GitHub, "LiveJournal.com and its source code," available on or before Jan. 30, 2016, retrieved on Oct. 3, 2018, https://github.com/apparentlymart/livejournal/ and 2 pages.
*Google LLC* v. *BlackBerry Lid.,* before the USPTO Patent Trial and Appeal Board, Case No. IPR2017-00911, Patent 8,745,149, Final Written Decision under 35 U.S.C. Section 318{a), entered on Aug. 28, 2018, pp. 1-37.
*Google LLC* v. *BlackBerry Lid.,* before the USPTO Patent Trial and Appeal Board, Case No. IPR2017-00912, Patent 8,745,149, Final Written Decision under 35 U.S.C. Section 318{a), entered on Aug. 28, 2018, pp. 1-50.
*Google LLC* v. *BlackBerry Ltd.,* before the US PTO Patent Trial and Appeal Board, Case IPR2017-00911 and IPR2017-00912, Patent 8,745,149 B2, Record of Oral Hearing held on May 30, 2018 before Sally C. Medley, Robert J. Weinschenk and Richard H. Marschall, Administrative Patent Judges.
*Google LLC* v. *BlackBerry Ltd.,* before the USPTO Patent Trial and Appeal Board, Case No. IPR2017-00911, Patent 8,745,149, Petitioner's Reply, Certificate of Service dated Mar. 29, 2018, 37 Pages.
*Google LLC* v. *BlackBerry Ltd.,* before the USPTO Patent Trial and Appeal Board, Case No. IPR2017-00912, Patent 8,745,149, Petitioner's Reply, Certificate of Service dated Mar. 29, 2018, 38 Pages.
Gralla, "How the Internet Works," Que Publishing, Sep. 1998, 6 pages.
Gralla, "SAMS Teach Yourself ICQ in 24 Hours," 2001, 413 pages.
Hansson et al., "Subtle and Public Notification Cues for Mobile Devices," International Conference on Ubiquitous Computing, Sep. 2001, 240-246.
Hargrave's Communications Dictionary, 2001, 234, 253.
Hargrave's Communications Dictionary, 2001, 234, 543.
Hill, "Yahoo! for Dummies," IDG Books Worldwide, Inc., 2001, 125 pages.
Human-Computer Interaction, 1994, 94-95.
IEEE 100 The Authoritative Dictionary of IEEE Standards Terms, 7th Ed., 2000, 281.
IEEE 100 The Authoritative Dictionary of IEEE Standards Terms, 7th Ed., 2000, 346-348.
IEEE 100 The Authoritative Dictionary of IEEE Standards Terms, 7th Ed., 2000, 556-557.
IEEE 100 The Authoritative Dictionary of IEEE Standards Terms, 7th Ed., 2000, 585.
IEEE 100 The Authoritative Dictionary of IEEE Standards Terms, 7th Ed., 2000, 700.
IEEE 100 The Authoritative Dictionary of IEEE Standards Terms, 7th Ed., 2000, 706.
IEEE 100 The Authoritative Dictionary of IEEE Standards Terms, 7th Ed., 2000,1103-1105.
IEEE The Authoritative Dictionary of IEEE Standards Terms, 7th Ed., 2000, 346-348.
Jabber Software Foundation, "Jabber Linux Clients," Feb. 5, 2003, https://web.archive.org/web/20030205060513/http://www.jabber.org:80/user/QElist.php?Platform=Linux.html, 1 page.
Jabber Software Foundation, "Jabber:: About," Feb. 1, 2003, https://web.archive.org/web/20030201081005/http://www.jabber.org:80/about/overview.html, 3 pages.
Jabber Software Foundation, "JSF: Logo Contest," Feb. 6, 2003, https://web.archive.org/web/20030206211858/http://www.jabber.org:80/, 2 pages.
Jackson et al., "Reducing the Effect of Email Interruptions on Employees," Int J Information Management, 2003, 23: 55-65.
Kaufeld, "America Online 7.0 for Dummies," Hungry Minds, Inc., 2002, 128 pages.
Kent, "The Complete Idiot's Guide to The Internet," Seventh Edition, Que, 2001, 46 pages.
Klyne and Newman, "Date and Time on the Internet: Timesteps," Network Working Group, Jul. 2002, 18 pages.
Lastoria, Gianluca; Search Report from corresponding European Application No. 10172832.7; Search completed Oct. 1, 2010.
Liu et al., "Software Timing Analysis Using HW/SW Cosimulation and Instruction Set Simulator," IEEE Hardware/Sofware Codesign, 1998, 65-69.
LiveJournal Server, Copyright 1999, http://www.livejournal.com/doc/server/, 52 pages.
LiveJournal, "About LiveJournal," retrieved on Oct. 3, 2018, https://www.livejournal.com/about, 1 page.
LiveJournal, "Brad Fitzpatrick's Friends," Feb. 23, 2002, https://web.archive.org/web/20020223193721/http://www.livejournal.com:80/users/bradfitz/friends, 3 pages.
LiveJournal, "Brad Fitzpatrick's Friends," Nov. 15, 2001, https://web.archive.org/web/20011117095744/http://www.livejournal.com:80/users/bradfitz/friends, 3 pages.
LiveJournal, "LiveJournal Business Forum," Feb. 8, 2002, https://web.archive.org/web/20020208160155/http://www.livejournal.com:80/users/ljbiz/, 3 pages.
LiveJournal, "LJ Maintenance's Friends," May 25, 2002, https://web.archive.org/web/20020223081621/http://www.livejournal.com:80/users/lj_maintenance/friends, 4 pages.
Longman Dictionary of American English, 4th Ed., 2008, 11, 583-584.
Longman Dictionary of American English, 4th Ed., 2008, 787 and 846.
Lotus Software, "Lotus Instant Messaging/Web Conferencing (XSametime): Building XSametime-Enabled Applications," IBM, 2003, 499 pages.
Lotus Software, "Lotus XSametime 3.1," IBM, Copyright 1998, 2003, 300 pages.
Lotus Software, "Lotus XSametime Application Development Guide," IBM, SG24-5651-00, International Technical Support Organization, May 2000, 139 pages.
Lynch, "The Instant-Messaging Wars Commence," PC Magazine, Sep. 21, 1999, 18(16): 56.
Maltzahn et al., "Reducing the Disk I/O of Web Proxy Server Caches," Proceedings of the 1999 USENIX Annual Technical Conference, Jun. 1999, 15 pages.
Mayer, "Passport 21," Uploaded on Apr. 2, 2009, https://www.flickr.com/photos/14529688@N08/3408501848, 1 page.
McCluskey, "Mac OS X 10 2 Jaguar Demo & Preso 2002," published on YouTube on or around Jun. 1, 2016, https://www.youtube.com/watch?v=plY50QfvEjI, 2 pages.
McGraw-Hill Dictionary of Scientific and Technical Terms, 6th Ed., 2003, 628, 922, 1046.
McGraw-Hill Dictionary of Scientific and Technical Terms, 6th Ed., 2003, 812, 2180, 1357-1358.
Mcpherson, How to Do Everything with Your Pocket PC, 2nd Ed., 2002, 34 pages.
Merriam-Webster's Collegiate Dictionary, 10th Ed., 1997, 260.
Merriam-Webster's Collegiate Dictionary, 10th Ed., 1997, 980-981.
Merriam-Webster's Collegiate Dictionary, 11 Ed., 2005, 12, 340, 634, and 715-715.
Merriam-Webster's Collegiate Dictionary, 11th Ed., 2005, 340.
Merriam-Webster's Collegiate Dictionary, 11th Ed., 2005, 619.
Merriam-Webster's Collegiate Dictionary, 11th Ed., 2005, 977-978 and 1004.
Microsoft Computer Dictionary, 5th Ed., 2002, 131, 421, 166-167, 239, 263-264, 541, 555-556, 572-573.

(56) References Cited

OTHER PUBLICATIONS

Microsoft Computer Dictionary, 5th Ed., 2002, 154, 274-275, and 285.
Microsoft Computer Dictionary, 5th Ed., 2002, 216.
Microsoft Computer Dictionary, 5th Ed., 2002, 344.
Microsoft Computer Dictionary, 5th Ed., 2002, 346 and 471.
Microsoft Computer Dictionary, 5th Ed., 2002, pp. 338, 513, and 572.
Microsoft Press Computer Dictionary, 3rd Ed., 1997, 192 and 387.
Microsoft Press Computer Dictionary, 3rd Ed., 1997, 86, 115 and 477.
Microsoft, "Microsoft Launches MSN Messenger Service," Microsoft Press Release, Jul. 21, 1999, retrieved on Sep. 18, 2018, http://news.microsoft.com/1999/07/21/microsoft-launches-msn-messenger-service/, 2 pages.
Microsoft, "MSN Messenger Service Becomes No. 1 Instant Messaging Service Worldwide," Microsoft Press Release, Mar. 16, 2001, retrieved on Sep. 18, 2018, https://news.microsoft.com/2001/03/16/msn-messenger-service-become-no-1-instant-messaging-service-worldwide/, 2 pages.
Miller-Wilson, "Value of Old Postcards," available on or before Jul. 9, 2011, https://antiques.lovetoknow.com/Value_of_Old_Postcards, 9 pages.
Minasi, "Mastering Windows XP Professional," Sybex, 2001, 1058 pages.
Missig, "iChat and Gabber: Interfaces Investigated," Computer-Mediated Communication, May 6, 2005, 25 pages.
Missig, "iChat Thought Bubbles," Feb. 4, 2003, https://web.archive.org/web/20030204074155/http://missig.org:80/julian/jabber/iChat, 7 pages.
Missig, "iChat Thought Bubbles," Mar. 19, 2004, https://web.archive.org/web/20040319221920/http://missig.org:80/julian/projects/jabber/iChat/, 6 pages.
Modern Dictionary of Electronics, 7th Ed., 1999, 109, 149, and 802-803.
Modern Dictionary of Electronics, 7th Ed., 1999, 276-277 and 785.
Molinar, "jaguar ichat expressyourself," published on YouTube on or around Jul. 20, 2014, available at https://www.youtube.com/watch?v=LjpvoG9d1BA, 2 pages.
Mook, "ICQ Celebrates Five Years," betanews.com, Nov. 15, 2001, https://betanews.com/2001/11/15/icq-celebrates-five-years/, 7 pages.
Neibauer, "How to Do Everything with Yahoo!," Osborne/McGraw-Hill, 2000, 28 pages.
Newton's Dictionary of Electronics, Jul. 2000, 352, 711-712, and 799-800.
Newton's Telecom Dictionary, 16.5th Ed., 2000, 277, 400, 437.
Newton's Telecom Dictionary, 16.5th Ed., 2000, 403.
Oikarinen and Reed, "Internet Relay Chat Protocol, Request for Comments: 1459," Network Working Group, May 1993, 61 pages.
Oikarinen, "IRC History," Internet Relay Chat, available on or before Sep. 19, 2000, http://www.irc.org/history_docs/jarkko.html, 1 page.
Paper No. 27, Patent Owner's Sur-Reply in the matter of *Google LLC v. BlackBerry Ltd.*, Before the Patent Trial and Appeal Board, Case No. IPR2017-00912, U.S. Pat. No. 8,745,149, before the USPTO Patent Trial and Appeal • Board, dated May 8, 2018, pp. 1-6.
PC World Staff, "Review: Top 15 laptops," CNN.com, Apr. 17, 2001, http://www.cnn.com/2001/TECH/ptech/04/17/top.notebooks.idg/index.html, 2 pages.
Petition for Interpartes Review of U.S. Pat. No. 8,745,149, *Google Inc. v. BlackBerry Ltd.*, filed on Feb. 16, 2017, before the USPTO Patent Trial and Appeal Board, Certificate of Service dated Feb. 16, 2017, pp. 1-60.
Petition for Interpartes Review of U.S. Pat. No. 8,745,149, *Google Inc. v. BlackBerry Ltd.*, filed on Feb. 16, 2017, before the USPTO Patent Trial and Appeal Board, Certificate of Service dated Feb. 16, 2017, pp. 1-70.
Pogue, "Mac OS X The Missing Manual," (1st ed.), Pogue Press/O'Reilly & Associates, Inc., Jan. 2002, 15 pages.
Pogue, "Mac OS X The Missing Manual," (2nd ed.), Pogue Press/O'Reilly & Associates, Inc., Oct. 2002, 29 pages.
Prosecution History for U.S. Appl. No. 13/111,675, U.S. Pat. No. 8,301,713, dated Oct. 30, 2012, 659 pages.
Pyra, "Using Internet Relay Chat," Que Corporation, 1995, 231 pages.
Random House Webster's College Dictionary, 2nd Ed., 2000, 1108.
Random House Webster's Computer & Internet Dictionary, 3rd Ed., 1999, 164, 237-238, 267-268.
Random House Webster's Computer & Internet Dictionary, 3rd Ed., 1999, 216.
Rothstein, "Old Letters stock image. Image of history, retro, stamp—27361," retrieved on Oct. 28, 2018, https://www.dreamstime.com/stock-image-old-letters-image27361, 4 pages.
Schaller, "GNOME Summary of Dec. 8, 2002-Aug. 16, 2002," https://groups.google.com/forum/message/raw?msg=mailing.gnome.announce/cksXSeKILAE/CNUHEomwrVAJ, Sep. 23, 2002, 6 pages.
Shape Services GmbH, "IM+ Multi-system Mobile Instant Messenger for Nokia 7650/3650," Version 2.18, Jan. 30, 2003, 18 pages.
Sheppard, Skype Hacks: Tip & Tools for Cheap, Fun, Innovative Phone Service, 2006, pp. 1-13.
Siracusa, "Mac OS X 10.2 Jaguar," Ars Technica, Sep. 5, 2002, https://arstechnica.com/gadgets/2002/09/macosx-10-2/12/, 5 pages.
Snader, Effective TCP/IP Programming: 44 Tips to Improve Your Network Programs, 2000, Chapters 1-2 and 4, 1-110 and 221-272.
*Snap Inc. v. Blackberry Limited*, "Decision Institution Inter Partes Review.", Case No. IPR2019-00937, U.S. Pat. No. 8,301,713, dated Oct. 8, 2019, 7 pages.
*Snap Inc. v. Blackberry Limited*, Declaration of Rajeev Surati, Ph.D., Case No. IPR2019-00937, U.S. Pat. No. 8,301,713, dated Jul. 9, 2019, 56 pages.
*Snap Inc. v. Blackberry Limited*, Patent Owner's Preliminary Response, Case No. IPR2019-00937, U.S. Pat. No. 8,301,713, dated Jul. 9, 2019, 66 pages.
*Snap Inc. v. Blackberry Limited*, Petition for Inter Partes Review, Case No. IPR2019-00937, U.S. Pat. No. 8,301,713, dated Apr. 5, 2019, 84 pages.
Snap Inc.'S Memorandum of Points and Authorities in Support of Its Motion To Dismiss Pursuant To FRCP 12(8)(6), in the case of BlackBerry Limited against Snap, Inc., in the U.S. District Court for the Central District of California, Case No. 2:18-CV-02693, filed on Jun. 3, 2018.
Sparmtacus, "Poma Ads: MacOS X 10.2 Jaguar "iChat"," published on or around Feb. 29, 2012, available at https://www.youtube.com/watch?v=PGmIo5uzQF0, 2 pages.
Stevens, TCP/IP Illustrated, vol. 1: The Protocols, 1994, Preface, Chapter 1-3 and 23, pp. 1-51 and 331-337.
Straight Dope Message Board, "Do they stamp passports anymore?," Oct. 2000, https://boards.straightdope.com/sdmb/showthread.php?t=43265, 14 pages.
Syahrina, "Comparing IM/Chat User Interfaces," Mar. 20, 2014, https://syahrina.wordpress.com/2014/03/20/comparing-imchat-user-interfaces/, 8 pages.
Temple, "SAMS Teach Yourself American Online 5 in 24 Hours," Sams Publishing, 2000, 109 pages.
The American Heritage College Dictionary, 4th Ed., 2002, 321.
The Computer Glossary: the Complete Illustrated Dictionary, 7th Ed., 1981, 190.
The IEEE Standard Dictionary of Electrical and Electronics Terms, 1996, 146, 209, and 1145.
The IEEE Standard Dictionary of Electrical and Electronics Terms, 1996, 396, 551, 989, and 1115.
Toshiba, "Toshiba Pocket PC e740 User's Manual," Mar. 2002, 182 pages.
Urquhart et al., "Passports," The Scotish Archive Network, 2000, http://www.scan.org.uk/knowledgebase/topics/passports_topic.htm, 1 page.
Varma, S.; Search Report from corresponding PCT Application No. PCT/CA2004/001712; search completed Dec. 1, 2004.
Watson et al., Your Official America Online Tour Guide, 6th ed., 2001, Chapters 1, 6, 7, and Appendix A 1-30, 121-162, 439-452.

(56) References Cited

OTHER PUBLICATIONS

Web page source printout from the Internet Archive <https://web.archive.org/web/20030204074155fw_/http://missig.org/julian/jabber/iChat/>, dated Mar. 26, 2019, 3 pages.
Webster's New World Computer Dictionary, 10th Ed., 2003, 145.
Webster's New World Dictionary of Computer Terms, 8th Ed., 2000, 540.
Weverka and Taylor, "ICQ 2000 for Dummies," IDG Books, Worldwide, Inc., 2001, 363 pages.
Weverka, "Mastering ICQ: The Official Guide," ICQ Press, 2001, 428 pages.
Wikipedia, "ICQ," available on or before Oct. 17, 2001, https://en.wikipedia.org/wiki/ICQ, 9 pages.
Wikipedia, "Windows Messenger," available on or before Jan. 25, 2003, https://en.wikipedia.org/wiki/Windows_Messenger, 2 pages.
Wikipedia, "Yahoo! Messenger," available on or before Mar. 21, 2003, https://en.wikipedia.org/wiki/Yahoo!_Messenger, 8 pages.
Wiley Encyclopedia of Computer Science and Engineering, vol. 3, 2009, 1464.
Williams, "The Robin Williams Mac OS X Book, Jaguar Edition," Peachpit Press, available on or before Feb. 12, 2003, 35 pages.
Wolfram MathWorld, "Seed," available on or before May 5, 2008, http://mathworld.wolfram.com/Seed.html, 2 pages.
Yahoo Inc., "Stay In Touch With Yahoo! Pager," Yahoo! press release, Mar. 9, 1998, retrieved on Sep. 17, 2018, available at https://web.archive.org/web/20101220214553/http://yhoo.QE.shareholder.com/press/releasedetail.cfm?ReleaseID=173501, Mar. 9, 1998, 1 page.
Yahoo Inc., "Yahoo! Messenger Makes The World A Little Smaller, More Informed," Yahoo! Press Release, Jun. 21, 1999, retrieved on Sep. 17, 2018, https://web.archive.org/web/20080331053818/http://yhoo.QE.shareholder.com:80/press/ReleaseDetail.cfm?ReleaseID=173605, Jun. 21, 1999, 1 page.

* cited by examiner

```
                    70    72      76          50
           66          68
    74  ▷    Hi Honey, how was your day?  78
        ◁ Brutal! Larry embarrassed me in front of
        everybody.   72 70    68
    66 ▷      What a Jerk!   68
    74 ◁ Yeah, but I got him back later with a karate chop!  ☺
                          2:44 pm                      68
    66 ▷     good for you  78   84           76
                   68  80
         72         FIG.4
```

```
                                                 50
        ▷    Hi Honey, how was your day?
        ◁ Brutal! Larry embarrassed me in front of
        everybody.                        76
        ▷    What a Jerk!
        ◁ Yeah, but I got him back later with a karate chop!  ☺
         80      72    2:44 pm
        ▷   good for you        84
         68          72   4:56 pm
                                      92
        ▷   Hey, want to go out tonight?
         80
         68   88
                   FIG.5
```

> Hi Honey, how was your day?
< Brutal! Larry embarrassed me in front of everybody.
> What a Jerk!
< Yeah, but I got him back later with a karate chop! ☺
> Hey, want to go out tonight? —180
       188    2:44 pm —184
               4:56 pm —192
< Sure, sounds fun.
> Great, I'LL pick you up in an hour.
< Can't wait

FIG. 7

> Hi Honey, how was your day?
< Brutal! Larry embarrassed me in front of everybody.
> What a Jerk! /282
284 < Yeah, but I got him back later with a karate chop! ☺
> [2:44 pm] 'Hey, want to go out tonight? —286
292 < [4:56 pm] Sure, sounds fun. —294  —280
> Great, I'LL pick you up in an hour.
< Can't wait 290  —288

*FIG. 8a*

> Hi Honey, how was your day?
< Brutal! Larry embarrassed me in front of everybody.
> What a Jerk!  /280    286
282 < Yeah, but I got him back later with a karate chop! ☺
> Hey, want to go out tonight? [2:44 pm] —284
292 < [4:56 pm] Sure, sounds fun. —294
> Great, I'LL pick you up in an hour.
< Can't wait 290    288

> Hi Honey, how was your day?
< Brutal! Larry embarrassed me in front of everybody.
> What a Jerk!
< Yeah, but I got him back later with a karate chop! ☺
☞ > Hey, want to go out tonight? — 2:44 pm
368   374                               378
< Sure, sounds fun.
> Great, I'LL pick you up in an hour.
< Can't wait

FIG.10

> Hi Honey, how was your day?
< Brutal! Larry embarrassed me in front of everybody.
> What a Jerk!
< Yeah, but I got him back later with a karate chop! ☺
> Hey, want to go out tonight?
< Sure, sounds fun.
> Great, I'LL pick you up in an hour.
☞ < Can't wait — LESS THAN ONE MINUTE AGO
468   474                               478

HANDHELD ELECTRONIC DEVICE AND ASSOCIATED METHOD PROVIDING TIME DATA IN A MESSAGING ENVIRONMENT

CROSS REFERENCE TO RELATED APPLICATIONS

This application is a continuation of U.S. patent application Ser. No. 16/983,861, filed on Aug. 3, 2020, which is a continuation of U.S. patent application Ser. No. 15/836,213, filed on Dec. 8, 2017 and issued as U.S. Pat. No. 10,735,353 on Aug. 4, 2020, which is a continuation of U.S. patent application Ser. No. 15/294,077, filed on Oct. 14, 2016 and issued as U.S. Pat. No. 10,708,202 on Jul. 7, 2020, which is a continuation of U.S. patent application Ser. No. 13/111,767, filed on May 19, 2011 and issued as U.S. Pat. No. 9,503,400 on Nov. 22, 2016, which is a continuation of U.S. patent application Ser. No. 10/944,925, filed on Sep. 20, 2004 and issued as U.S. Pat. No. 7,970,849 on Jun. 8, 2011, which claims the benefit of priority to U.S. Provisional Application No. 60/504,379, filed on Sep. 19, 2003, all of which are herein incorporated by reference.

BACKGROUND OF THE INVENTION

1. Field of the Invention

The invention relates generally to handheld electronic devices and, more particularly, to a handheld electronic device and a method for providing information representative of the times of certain communications in a messaging environment.

2. Background of the Invention

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also feature wireless communication capability, although many such handheld electronic devices are stand-alone devices that are functional without communication with other devices. With advances in technology, handheld electronic devices are being configured to include greater numbers of features while having relatively smaller form factors.

Electronic devices, including handheld electronic devices, are capable of numerous types of communication. One type of communication is "messaging", and one type of messaging is "instant messaging" which enables a first device to send a message on a more or less instantaneous basis to a second device. With most all instant messaging, a given electronic device is provided with an interface that outputs the various communications that have occurred between the electronic device and another electronic device during a messaging "conversation". A sample output on an electronic device that is representative of the various communications that have occurred during a conversation may be as follows:

Hi Honey, how was your day?
<Brutal! Larry embarrassed me in front of everybody. What a Jerk!
<Yeah, but I got him back later with a karate chop!☺
good for you.

In this example, incoming messages are indicated by a greater than ">" mathematical symbol, and outgoing messages are indicated by a less than "<" mathematical symbol. If the conversation continues quickly, i.e., substantially without interruption, the messages do not need a time stamp on them. In the environment of a handheld electronic device, it would be desirable to avoid unnecessary time stamps and other unnecessary output since it occupies too much valuable space on the limited display of the handheld electronic device.

In some messaging circumstances, however, it may be desirable for information regarding certain timing aspects of conversation to be available to a user. Nevertheless, the limited space available on a display of a handheld electronic device has made a solution difficult. It thus would be desirable to provide an improved handheld electronic device and an associated method that provide time data in a messaging environment.

SUMMARY OF THE INVENTION

An improved handheld electronic device and an associated method are provided in which time data regarding certain aspects of a messaging conversation on a handheld electronic device are made available to a user. Such time data is provided, for instance, in situations where an interruption has occurred during a messaging conversation. Time data can also be provided to a user on demand in certain circumstances.

Accordingly, an aspect of the invention is to provide an improved handheld electronic device and a method in which data regarding the times at which certain communications have occurred in a messaging environment are made available to a user.

Another aspect of the invention is to provide an improved handheld electronic device and a method that enables a user to be made aware of certain timing aspects of a conversation in a messaging environment.

Another aspect of the invention is to provide an improved handheld electronic device and a method in which data regarding the times at which certain communications have occurred are made available to a user while limiting the amount of display area that is occupied by such data.

Another aspect of the invention is to provide an improved handheld electronic device and a method in which data can be provided regarding the elapsed time since a communication.

Accordingly, an aspect of the invention is to provide an improved method of providing an output on at least one of a first electronic device and a second electronic device, with the first electronic device being adapted to be in electronic communication with a second electronic device. The general nature of the method can be stated as including determining that a first messaging communication has occurred at a first time between the first device and the second device, outputting a first indication that is representative of at least a portion of the first communication, determining that a predetermined period of time has elapsed since the first time substantially without further communication between the first device and the second device and, responsive to determining that a predetermined period of time has elapsed, outputting a first time stamp representative of the first time.

Another aspect of the invention is to provide an improved method of providing an output on at least one of a first electronic device and a second electronic device, with the first electronic device being adapted to be in electronic communication with a second electronic device. The general nature of the method can be stated as including determining that a first messaging communication has occurred at a first time between the first device and the second device, outputting a first indication that is representative of at least a portion of the first communication, detecting a predetermined input and, responsive to detecting a predetermined input, outputting a first time stamp representative of the first time.

Another aspect of the invention is to provide an improved method of providing an output on at least one of a first electronic device and a second electronic device, with the first electronic device being adapted to be in electronic communication with a second electronic device. The general nature of the method can be stated as including determining that a first messaging communication has occurred at a first time between the first device and the second device, outputting a first indication that is representative of at least a portion of the first communication, determining that a first period of time has elapsed since the first time substantially without further communication between the first device and the second device and, responsive to determining that a first period of time has elapsed, outputting a first time stamp representative of the first period of time.

Another aspect of the invention is to provide an improved handheld electronic device of a type that is adapted to be in electronic communication with another electronic device. The general nature of the handheld electronic device can be stated as including a processor apparatus, an input apparatus, and an output apparatus. The processor apparatus includes a processor and a memory and is adapted to receive input from the input apparatus and to provide output to the output apparatus. The processor apparatus also is adapted to determine that a first messaging communication has occurred at a first time between the handheld electronic device and the other electronic device. The output apparatus is adapted to output a first indication that is representative of at least a portion of the first communication. The processor apparatus is adapted to determine that a predetermined period of time has elapsed since the first time substantially without further communication between the handheld electronic device and the other electronic device. Responsive to a determination that a predetermined period of time has elapsed, the output apparatus is adapted to output a first time stamp representative of the first time.

BRIEF DESCRIPTION OF THE DRAWINGS

A full understanding of the invention can be gained from the following Description of the Preferred Embodiments when read in conjunction with the accompanying drawings in which:

FIG. 4 is an exemplary view of an output provided in accordance with an aspect of the method of the invention;

FIG. 5 is another exemplary view of an output provided in accordance with an aspect of the method of the invention;

FIG. 7 is another exemplary view of an output provided in accordance with an aspect of the method of the invention;

FIG. 8a is another exemplary view of an output provided in accordance with an aspect of the method of the invention;

FIG. 8b is another exemplary view of an output provided in accordance with an aspect of the method of the invention;

FIG. 9 is another exemplary view of an output provided in accordance with an aspect of the method of the invention; and FIG. 10 is another exemplary view of an output provided in accordance with an aspect of the method of the invention.

Similar numerals refer to similar parts to the specification.

DESCRIPTION OF THE PREFERRED EMBODIMENTS

Figure 1:
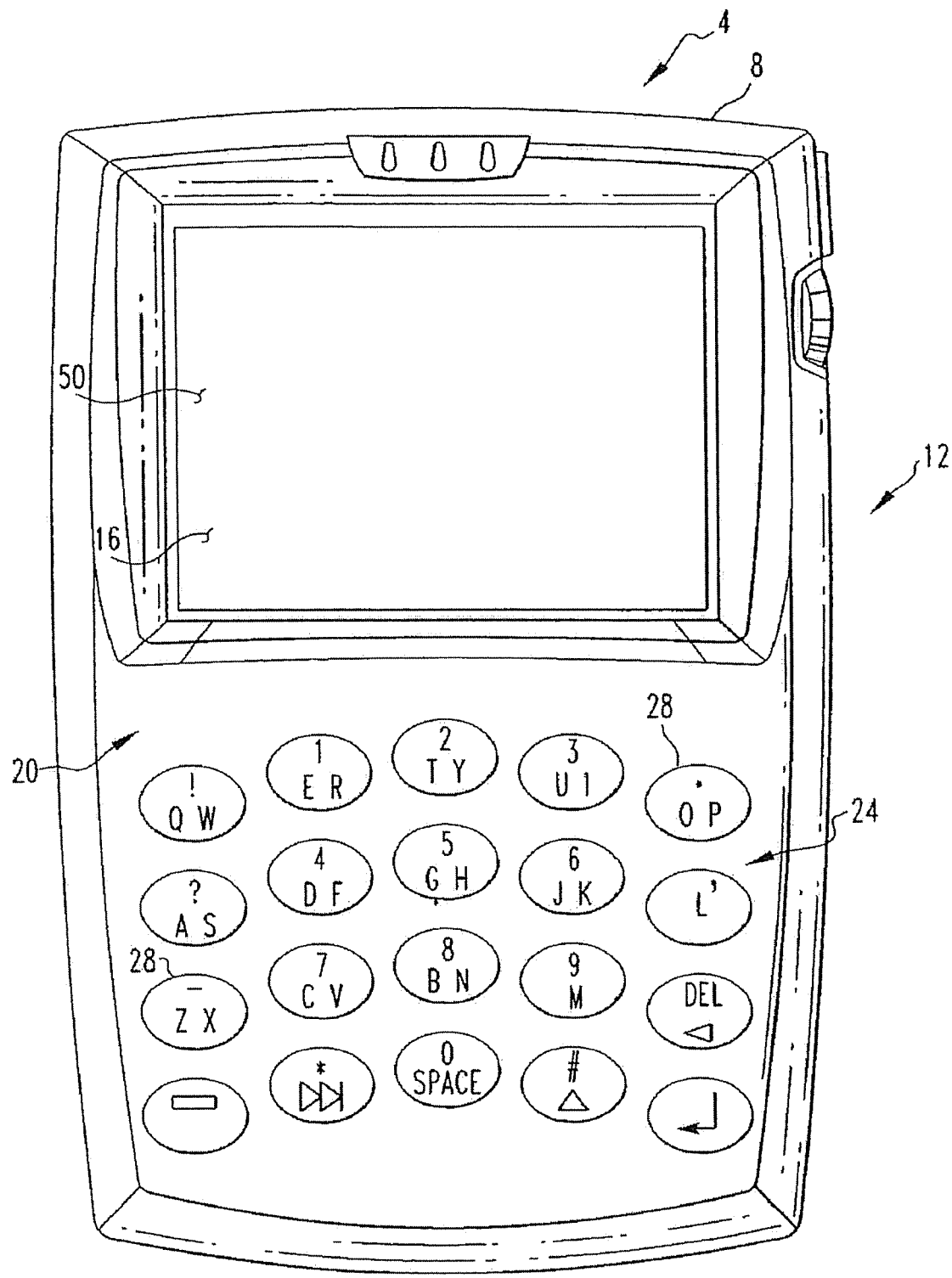
FIG. 1 is an exemplary top plan view of a handheld electronic device in accordance with the invention which can be used in conjunction with an improved method in accordance with the invention.
Figure 2:
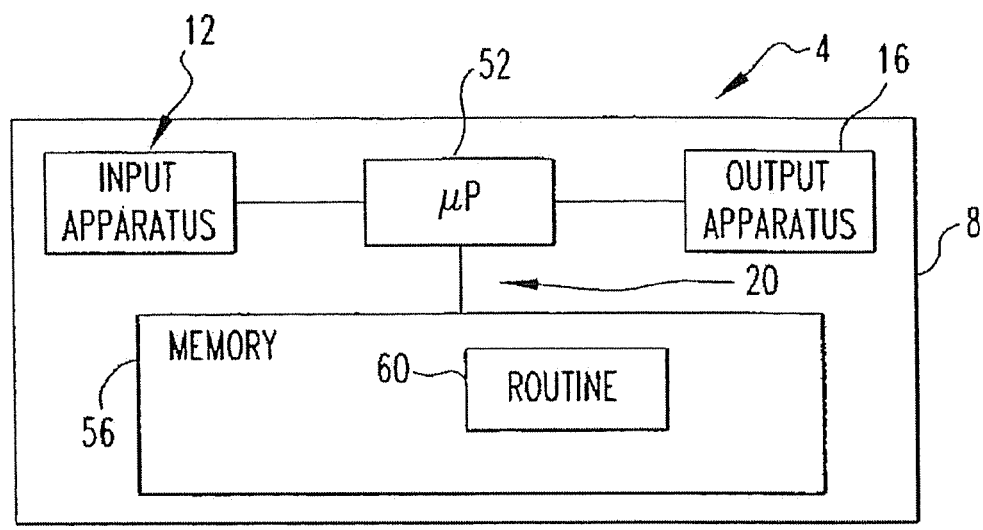
FIG. 2 is a schematic view of the handheld electronic device of FIG. 1.

An improved handheld electronic device 4 in accordance with the invention is indicated generally in FIG. 1 and is depicted schematically in FIG. 2. The exemplary handheld electronic device 4 includes a housing 8 upon which are disposed an input apparatus 12, an output apparatus 16 and a processor apparatus 20. The input apparatus 12 includes a keypad 24 that can be said to include a plurality of keys 28.

The output apparatus 16 includes a display 50. The output apparatus 16 can additionally include, for instance, additional indicators such as lights, and the like, and can additionally include an audible output such as a speaker as well as other output devices.

The processor apparatus 20 includes a processor 52 that can be, for instance, and without limitation, a microprocessor (µP), and it is responsive to inputs from the input apparatus 12 and provides output signals to the output apparatus 16. The processor apparatus 20 further includes a memory 56 that includes a routine 60 stored therein. The exemplary routine 60 is a messaging routine that can provide a messaging capability on the device 4. It is understood that the memory 56 likely includes a number of other routines that are not expressly mentioned herein. As employed herein, the expression "a number of" and variations thereof shall refer broadly to any nonzero quantity including a quantity of one. The processor 52 interfaces with the memory 56, and the routine 60 is executable on the processor 52.

Figure 3:
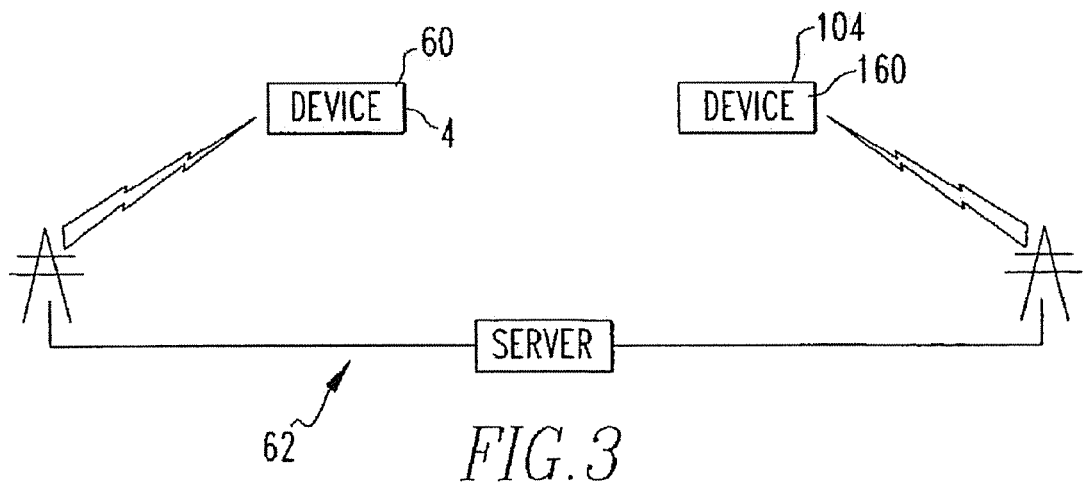
FIG. 3 is a schematic view of the handheld electronic device of FIG. 1 and another device in a messaging environment.

The device 4 further includes a wireless communication system. As can be seen in FIG. 3, the device 4 with the routine 60 can interface with a messaging service 62 to wirelessly provide the messaging capability on the device 4. In the depicted exemplary embodiment, the messaging service 62 provides an instant messaging capability on the device 4 and on the other electronic devices having routines that are subscribers to the messaging service 62. The messaging service 62 is schematically depicted as including a server, although the teachings herein are not limited to messaging services that employ a server. For instance, the messaging service could, for example, provide a point-to-point communication capability such as is provided with the Bluetooth protocol, or may provide some other type of communication capability, whether or not wireless.

FIG. 3 further depicts another device 104 as being a device having a routine that is another subscriber to the messaging service 62. Specifically, the device 104 is an electronic device having a routine 160 thereon which can communicate with the messaging service 62 to provide a messaging capability on the device 104. While the exemplary devices 4 and 104 are depicted as having a wireless connection with the messaging service 62, it is understood that either or both of the devices 4 and 104 may employ a non-wireless communication capability and still not depart from the concept of the invention. It is further understood that while only the two devices 4 and 104 are depicted in FIG. 3 as being subscribers to the messaging service 62, many more subscribers to the messaging service 62 may exist but are not expressly depicted in FIG. 3.

During the course of an electronic conversation, such as depicted in FIG. 4 between, for instance, the devices 4 and 104, a number of messages 68 are communicated between the devices 4 and 104. An incoming message 72 received on, for instance, the device 4, provides a visual indication of a communication that has been transmitted from, for instance, the device 104 to the device 4. As can be seen in FIG. 4, an incoming message 72 includes an incoming symbol 66 and an incoming text portion 70. In the exemplary output depicted herein, the incoming symbol 66 is a mathematical greater than ">" symbol. The text portion 70 is an exemplary linguistic output that could be of numerous types of forms, such as in different languages, and also can include, for instance, symbols and the like that need not necessarily be a part of any particular language.

An outgoing message 76 is depicted as including an outgoing symbol 74, and an outgoing text portion 78. In the exemplary output depicted herein, the outgoing symbol 74 is a mathematical less than "<" symbol. The text portion 78 is an exemplary linguistic output that could be of numerous types of forms.

As can be further seen from FIG. 4, the exemplary conversation depicted therein includes a plurality of incoming messages 72 and a plurality of outgoing messages 76 that are transmitted between the devices 4 and 104 at a conversational speed, i.e., at a speed in which back-to-back communications between the devices 4 and 104 occur without a meaningful delay therebetween. Due to the conversational speed of the back-to-back communications, the messages 68 do not include an indication of the times at which such messages 68 were transmitted, it being assumed as a general matter that in such circumstances the specific time at which a given message within such a conversation occurred may not be of significance to a user.

At a certain point in the exemplary conversation, though, an exemplary message 68 which, for example, may be an outgoing message 76, may also become a non-responded-to message 80, meaning that subsequent to its transmission substantially no additional communication occurs between the device 4 and 104 within a predetermined duration of time. More specifically, as the conversation transpires, the back-to-back incoming messages 72 and outgoing messages 76 are displayed adjacent one another. However, after the expiration of a predetermined duration of time after the transmission of a message 68, for instance ten minutes, in which substantially no additional communication occurs between the device 4 and 104, the message 68 is determined in accordance with the invention to be a non-responded-to message 80, and responsive to such determination a first time stamp 84 is output adjacent the non-responded-to message 80. For instance, if the non-responded-to message 80 was transmitted at 2:44 PM, and if substantially no additional communication between the device 4 and 104 occurs between 2:44 PM and 2:54 PM, at 2:54 PM the first time stamp 84 "2:44 pm" is output to provide to the users of the devices 4 and 104 an indication that the conversation was interrupted at 2:44 PM. Such selective outputting of the first time stamp 84 generally only in response to a message 68 of some significance, such as the terminal message of a conversation, saves space on the display 50. It is noted that the display of the first time stamp 84 typically will occur on both the device 4 and the device 104.

It is understood, however, that the time duration of ten minutes is completely exemplary and that the time duration could be set at any duration. It is also understood that the first time stamp 84 can be output in response to the occurrence of additional and/or other predetermined events. Moreover, it is noted that the predetermined time duration may be variable depending upon the characteristics of the conversation. For instance, if messages are being exchanged on a more infrequent basis, such as every nine minutes, the predetermined duration of time after which the first time stamp 84 is output may be adjusted to be twenty minutes, for example.

By way of further example, and as is depicted generally in FIG. 5, another message 68 may subsequently be communicated between the devices 4 and 104. Since the message 68 corresponds with a resumption of communication between the devices 4 and 104 after a period of interruption, the message 68 is determined to be a resumption message 88, and a second time stamp 92 is output adjacent the resumption message 88. A user thus can determine from the output on the display 50 the period of time during which the conversation was suspended, i.e., the time between transmission of the non-responded-to message 80 and transmission of the resumption message 88. Selective outputting of the second time stamp 92 saves space on the display 50. In this depicted example, the first time stamp 84 is disposed, for example, adjacent the non-responded-to message 80, and the second time stamp 92 is disposed, for example, adjacent the resumption message 88. It is also noted that the second time stamp 92 is disposed, for example, between the non-responded-to message 80 and the resumption message 88.

Figure 6A:
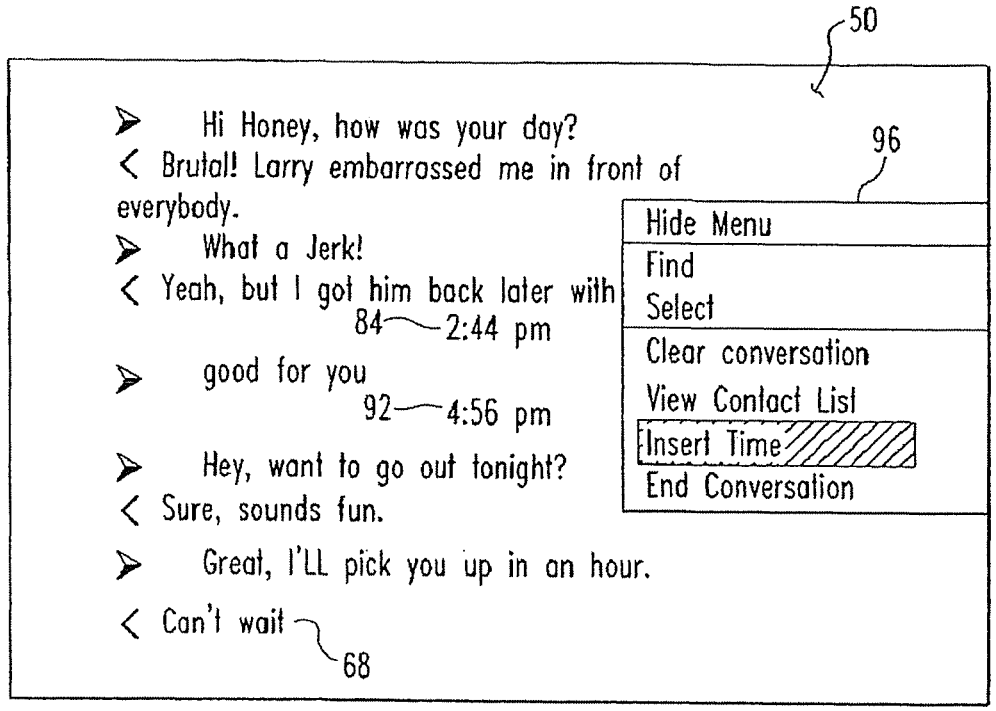
FIG. 6a is another exemplary view of an output provided in accordance with an aspect of the method of the invention.
Figure 6B:
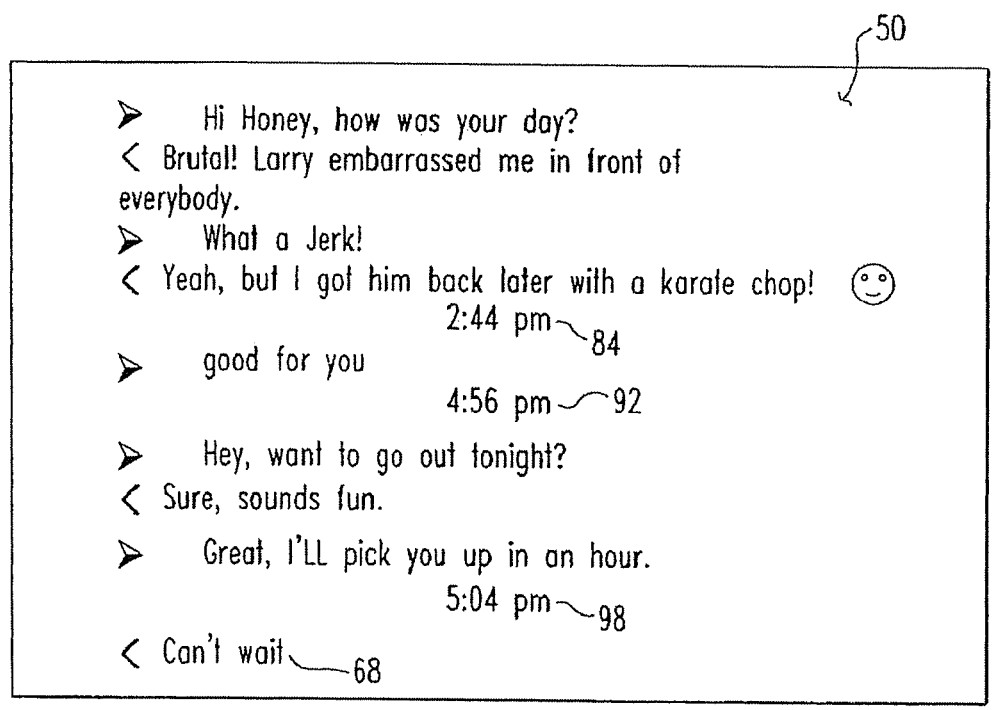
FIG. 6b is another exemplary view of an output provided in accordance with an aspect of the method of the invention.

As the conversation continues after transmission of the resumption message 88, one of the users of the devices 4 and 104 may determine that a time stamp would desirably be displayed in association with a message 68, such as if the user wished to emphasize to himself or herself, or to the other user, the time at which the message 68 was transmitted. If such a time stamp is desired, the user may activate a user interface 96, such as the exemplary user interface 96 of FIG. 6a, which can manually cause the output of an inserted time stamp 98 adjacent the message 68, as in FIG. 6b. As mentioned above, the inserted time stamp 98 can be made to appear on both the device 4 and the device 104, and it is also noted that, if desired, the inserted time stamp 98 could be made to appear on only one or the other of the devices 4 and 104.

As can be seen in FIG. 7, the output could provide a non-responded-to message 180 and a resumption message 188, with a first time stamp 184 being disposed adjacent the non-responded-to message 180, and with a second time stamp 192 being disposed adjacent the resumption message 188. However, in the exemplary output of FIG. 7 the first time stamp 184 and the second time stamp 192 are disposed adjacent one another and are both disposed between the non-responded-to message 180 and the resumption message 188. Such an exemplary display of the first and second time stamps 184 and 192 illustrates the gap in the conversation that occurred between transmission of the non-responded-to message 180 and transmission of the resumption message 188. It is noted that the first time stamp 184 and the second time stamp 192 may have been generated in a fashion similar to the generation of the first time stamp 84 and the second time stamp 92.

As can be seen in FIGS. 8a and 8b, the time stamps can be output in other places. For instance, a text portion of a non-responded-to message 280 may have a beginning 282 and an ending 286. Similarly, a text portion of a resumption message 288 may have a beginning 290 and an ending 294. In accordance with another aspect of the invention, a first time stamp 284 can be output at either the beginning 282 or the ending 286 of the text portion of the non-responded-to message 280, and in the example of FIG. 8*a* the exemplary first time stamp 284 is output at the beginning 282. Also, a second time stamp 292 can be output at either the beginning 290 or the ending 294 of the text portion of the resumption message 288, and in the example of FIG. 8*a* the exemplary second time stamp 292 is output at the beginning 290. Other positioning of the first time stamp 284 and the second time stamp 292 are possible within the concept of the invention.

For instance, and as another example, FIG. 8*b* depicts the exemplary first time stamp 284 as being output at the ending 286 while the exemplary second time stamp 292 is output at the beginning 290. FIGS. 8*a* and 8*b* depict different exemplary ways in which the first and second time stamps 284 and 292 can be output to provide time data to a user. In FIG. 8*a* the first and second time stamps 284 and 292 are disposed at a consistent location, i.e., at the beginnings 282 and 290 of the text portions of the non-responded-to message 280 and the resumption message 288. FIG. 8*b* disposes the first and second time stamps 284 and 292 generally between the ending 286 of the non-responded-to message 280 and the beginning 290 of the resumption message 288, which focuses the attention of the user on the interval during which the conversation was interrupted. Other ways of outputting the first and second time stamps 284 and 292 will be apparent.

Another way of providing time stamps in a fashion that saves space on the display 50 is depicted in FIG. 9. Specifically, the messages 368 are output without displayed time stamps, but upon moving a cursor 374 or other pointing device or other device in proximity to a given message 368 a corresponding requested time stamp is output adjacent the message 368. In this way, the messages 368 can be provided without also displaying time stamps, but if a time stamp is desired as to any of the messages 368 a requested time stamp 378 can be readily output. In this regard, the requested time stamp 378 may be output for only a predetermined duration of time, for instance a few seconds, and/or the requested time stamp 378 may be deleted from the display 50 upon a detection of another input, such as from the input apparatus 12 or otherwise. In this regard, all of the messages 368 can have time stamps associated therewith that are not displayed until requested.

It is also noted that the requested time stamp 378 need not be requested by the cursor 374, and rather could be requested with virtually any other type of input desired, such as with a stylus and a touch sensitive screen, by an actuation of a key, or by the use of alternate pointing or other devices. Other ways of managing the output of the requested time stamp 378 as to any of the messages 368 will be apparent.

It is noted that the appearances of the various time stamps herein is completely exemplary, and that the time stamps could be provided in any format without departing from the concept of the invention. In this regard, and in accordance with another aspect of the invention, a given time stamp may be a smart time stamp and provide additional information depending upon the prevailing circumstances. For instance, if the first time stamp 84 of FIG. 4 was output as indicated above, and if the conversation was not resumed until the following day, the first time stamp 84 potentially could be configured to automatically change from being displayed as "2:44 pm" on the day of communication of the non-responded-to message 80 to being displayed as, for instance, "2:44 pm Thursday" or, for instance, "2:44 PM Sep. 17, 2004" or, for instance, "2:44 pm yesterday" on the following day, although other configurations will be apparent and will be within the concept of the invention.

Further in this regard, the time stamps can be configured to depict relative times, i.e., elapsed times, rather than absolute times. For instance, and as is depicted generally in FIG. 10, a time stamp 478 associated with a message 468 can be output to say, for example, "less than one minute ago", meaning that the message 468 that has been activated by the cursor 474 has been transmitted less than one minute prior to the current time.

Such a time stamp 478 could be configured to be an active time stamp, meaning that it would change as time progressed. For instance, the time stamp 478 could progressively change from saying "less than one minute ago" to saying "one minute ago", "two minutes ago", "forty-five minutes ago", and the like as time progressed. Such a time stamp also could be configured, for instance, to revert back to displaying an absolute time after the expiration of a given time duration. For example, once the message 468 is one hour old, for instance, the time stamp 478 might be configured to no longer output a relative time such as "fifty-nine minutes ago", and rather to output an absolute time such as "2:54 pm". Other variations can be provided without departing from the concept of the invention.

If it is desired to provide such time stamps that output relative times, it might also be desirable to output such time stamps in any of the fashions set forth above, and such time stamps potentially could be configured to be output without first detecting a delay or a break in the "conversation". For instance, the time stamp "less than a minute ago" could be displayed immediately upon receiving a message on the handheld electronic device 4, if such a configuration is desired. In such a configuration, and in order to save space on the display 50, the handheld electronic device 4 may be configured to provide such a relative time stamp only for the most recently transmitted message. That is, responsive to detecting the transmission of a message, the handheld electronic device may be configured to substantially immediately output a time stamp such as "less than a minute ago". After one minute the time stamp may be altered to say "one minute ago", and the like. However, upon the transmission of an additional message, the time stamp for the prior message can be deleted and a new time stamp such as "less than a minute ago" can be provided with respect to the new message.

Such relative time stamps provide to the user an expedited understanding of the timing aspects of the message. That is, the user can understand an aspect of the time of transmission without having to refer to the current time. This advantageously saves effort by the user because it eliminates the mental step of determining the current time and subtracting therefrom an absolute time displayed by a time stamp to determine the elapsed time since transmission of the message.

The different fashions of selectively providing intelligent time data in the form of selectively output time stamps advantageously saves valuable space on the display 50. Moreover, such selective outputting of time stamps advantageously avoids unnecessary visual clutter on the display 50.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. An electronic device, comprising:
   a display;
   at least one hardware processor; and
   a non-transitory computer-readable storage medium coupled to the at least one hardware processor and storing programming instructions for execution by the at least one hardware processor, wherein the programming instructions, when executed, cause the electronic device to perform operations comprising:
   displaying, at the electronic device, a user interface object representing an electronic conversation between the electronic device and a second electronic device, wherein the electronic conversation comprises a plurality of messaging communications between the electronic device and the second electronic device, the plurality of messaging communications comprising at least a first messaging communication and a second messaging communication, and the user interface object comprising at least a portion of each of the plurality of messaging communications in the electronic conversation;
   displaying, at the electronic device and in the user interface object representing the electronic conversation, a first time stamp representing a time that the first messaging communication occurs, wherein the first time stamp comprises a first indication presented in a form of a relative time; and
   updating the first time stamp displayed in the user interface object by changing the relative time to an absolute time after a configured duration.

2. The electronic device of claim 1, the operations further comprising: in response to detecting a new messaging communication in the electronic conversation, removing the first time stamp and outputting, in the user interface object representing the electronic conversation, another time stamp representing a time that the new messaging communication occurs, wherein the another time stamp comprises another indication presented in a form of relative time.

3. A non-transitory computer-readable medium storing instructions which, when executed, cause an electronic device to perform operations comprising:
   displaying, at the electronic device, a user interface object representing an electronic conversation between the electronic device and a second electronic device, wherein the electronic conversation comprises a plurality of messaging communications between the electronic device and the second electronic device, the plurality of messaging communications comprising at least a first messaging communication and a second messaging communication, and the user interface object comprising at least a portion of each of the plurality of messaging communications in the electronic conversation;
   displaying, at the electronic device and in the user interface object representing the electronic conversation, a first time stamp representing a time that the first messaging communication occurs, wherein the first time stamp comprises a first indication presented in a form of a relative time; and
   updating the first time stamp displayed in the user interface object by changing the relative time to an absolute time after a configured duration.

4. The non-transitory computer-readable medium of claim 3, the operations further comprising: in response to detecting a new messaging communication in the electronic conversation, removing the first time stamp and outputting, in the user interface object representing the electronic conversation, another time stamp representing a time that the new messaging communication occurs, wherein the another time stamp comprises another indication presented in a form of relative time.

5. A method, comprising:
   displaying, at an electronic device, a user interface object representing an electronic conversation between the electronic device and a second electronic device, wherein the electronic conversation comprises a plurality of messaging communications between the electronic device and the second electronic device, the plurality of messaging communications comprising at least a first messaging communication and a second messaging communication, and the user interface object comprising at least a portion of each of the plurality of messaging communications in the electronic conversation;
   displaying, at the electronic device and in the user interface object representing the electronic conversation, a first time stamp representing a time that the first messaging communication occurs, wherein the first time stamp comprises a first indication presented in a form of a relative time; and
   updating the first time stamp displayed in the user interface object by changing the relative time to an absolute time after a configured duration.

6. The method of claim 5, further comprising: in response to detecting a new messaging communication in the electronic conversation, removing the first time stamp and outputting, in the user interface object representing the electronic conversation, another time stamp representing a time that the new messaging communication occurs, wherein the another time stamp comprises another indication presented in a form of relative time.

* * * * *